United States Patent
Li

(10) Patent No.: US 11,764,924 B2
(45) Date of Patent: *Sep. 19, 2023

(54) METHOD AND APPARATUS FOR SENDING REFERENCE SIGNAL, METHOD AND APPARATUS FOR RECEIVING REFERENCE SIGNAL, VEHICLE-MOUNTED DEVICE, AND TERMINAL

(71) Applicant: BEIJING XIAOMI MOBILE SOFTWARE CO., LTD., Beijing (CN)

(72) Inventor: Mingju Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 114 days.

This patent is subject to a terminal disclaimer.

(21) Appl. No.: 17/267,732

(22) PCT Filed: Aug. 10, 2018

(86) PCT No.: PCT/CN2018/100065
§ 371 (c)(1),
(2) Date: Feb. 10, 2021

(87) PCT Pub. No.: WO2020/029284
PCT Pub. Date: Feb. 13, 2020

(65) Prior Publication Data
US 2021/0320766 A1 Oct. 14, 2021

(51) Int. Cl.
*H04L 5/00* (2006.01)
*H04W 4/40* (2018.01)
(Continued)

(52) U.S. Cl.
CPC .......... *H04L 5/0048* (2013.01); *H04L 5/0053* (2013.01); *H04W 4/40* (2018.02); *H04W 56/001* (2013.01); *H04W 72/23* (2023.01)

(58) Field of Classification Search
CPC ...... H04L 5/0048; H04L 5/0053; H04W 4/40; H04W 56/001; H04W 72/042
See application file for complete search history.

(56) References Cited

U.S. PATENT DOCUMENTS 10,631,254 B2 * 4/2020 Lee .................. H04L 25/03006
2019/0045469 A1 2/2019 Zhang et al.
(Continued)

FOREIGN PATENT DOCUMENTS

| CN | 106797611 A | 5/2017 |
| CN | 107046461 A | 8/2017 |

(Continued)

OTHER PUBLICATIONS

State Intellectual Property Office of the People's Republic of China, Office Action and Search Report Issued in Application No. 201880001758.3, dated Jan. 29, 2021, (Submitted with Machine/Partial Translation), (19p).

(Continued)

*Primary Examiner* — Ronald B Abelson
(74) *Attorney, Agent, or Firm* — Arch & Lake LLP

(57) ABSTRACT

A method, a vehicle user equipment (UE), and a terminal are provided for transmitting a reference signal. The method includes that the vehicle UE determines transmission configuration information of a synchronization signal block (VSSB) of a new radio-vehicle-to-everything (NR-V2X) system. The transmission configuration information includes transmission period of the VSSB, and a time domain position of a VSSB transmission time window within the transmission period. The method further includes that the vehicle UE transmits, according to the transmission configuration information, one or more VSSBs within the VSSB transmission time window that occurs periodically. Each VSSB includes a primary sidelink synchronization signal (PSSS), a secondary sidelink synchronization signal (SSSS), a physi- (Continued)

cal sidelink broadcast channel (PSBCH) signal, and a demodulation reference signal (DMRS).

19 Claims, 11 Drawing Sheets

(51) Int. Cl.
  *H04W 56/00* (2009.01)
  *H04W 72/10* (2009.01)
  *H04W 72/23* (2023.01)

(56) References Cited

U.S. PATENT DOCUMENTS

| | | | |
|---|---|---|---|
| 2019/0200306 | A1 | 6/2019 | Ko et al. |
| 2020/0008164 | A1 | 1/2020 | Ko et al. |
| 2020/0344704 | A1 | 10/2020 | Ko et al. |
| 2021/0127341 | A1 | 4/2021 | Yasukawa et al. |
| 2021/0168574 | A1* | 6/2021 | Zhang .................. H04W 8/005 |

FOREIGN PATENT DOCUMENTS

| | | | |
|---|---|---|---|
| CN | 107666452 | A | 2/2018 |
| CN | 108141340 | A | 6/2018 |
| CN | 108270710 | A | 7/2018 |
| EP | 3337068 | A1 | 6/2018 |
| RU | 2654534 | C1 | 5/2018 |
| WO | 2017026477 | A1 | 2/2017 |
| WO | 2017134979 | A1 | 8/2017 |
| WO | 2017135650 | A1 | 8/2017 |
| WO | 2018111034 | A1 | 6/2018 |
| WO | 2018126472 | A1 | 7/2018 |
| WO | 2018143771 | A1 | 8/2018 |

OTHER PUBLICATIONS

State Intellectual Property Office of the People's Republic of China, Office Action and Search Report Issued in Application No. 201880001758.3, dated May 21, 2021, (Submitted with Machine/Partial Translation), (31p).

ISA State Intellectual Property Office of the People's Republic of China, Written Opinion of the International Searching Authority Issued in Application No. PCT/CN2018/100065, dated May 8, 2019, WIPO, (11p).

European Patent Office, Extended European Search Report Issued in Application No. 18929816.9, dated Jul. 2, 2021, (13p).

Itri, "Enhancement to Sidelink Physical Layer Structure in Super High Doppler Case for V2V", 3GPP TSG RAN WG1 Meeting #85, Nanjing, China, R1-164932, May 23-27, 2016, (8p).

International Search Report of PCT Application No. PCT/CN2018/100065 dated May 8, 2019 with English translation (4p).

First Office Action issued to Chinese Application No. 201880001758.3 dated Jul. 21, 2020 with English translation, (21p).

Ericsson, "Additional SIB in EUTRAN for Supporting NR SA Deployments," 3GPP TSG-RAN WG2#100, R2-1712346, Dec. 1, 2017, (4p).

Intellectual property India, Office Action Issued in Application No. 202147009728, dated Feb. 3, 2022, (7 pages). (Submitted with Partial Machine Translation).

Japanese Patent Office Action, Office Action Issued in Application No. 2021-506922, dated Apr. 1, 2022, (12 pages). (Submitted with Partial Machine Translation).

Sony, "Discussion on DMRS enhancement and operation for V2V", 3GPP TSG RAN WG1 Meeting #84bis, R1-162559, Busan, Korea Apr. 11-15, 2016, (3 pages).

First Office Action Notice of Submission of Opinion of Korean Application No. 10-2021-7006950 dated Apr. 30, 2022 with English translation, (6p).

Japanese Patent Office, Decision of Rejection Issued in Application No. 2021-506922, dated Oct. 27, 2022, with Machine English Translation, (11p).

Korean Intellectual Property Office, Office Action Issued in Application No. 10-2021-7006950, dated Nov. 29, 2022, with Machine English Translation, (8p).

Korean Intellectual Property Office, Office Action Issued in Application No. 10-2021-7006950, dated May 26, 2023, Submitted with Machine Translation,(9p).

Nokia, Alcatel-Lucent Shanghai Bell,"On System Design for Multiple Numerologies—Initial Access",3GPP TSG-RAN WG1 #86, R1-167258, Gothenburg, Sweden, Aug. 22-26, 2016, (6p).

* cited by examiner

METHOD AND APPARATUS FOR SENDING REFERENCE SIGNAL, METHOD AND APPARATUS FOR RECEIVING REFERENCE SIGNAL, VEHICLE-MOUNTED DEVICE, AND TERMINAL

CROSS REFERENCE TO RELATED APPLICATIONS

This application is the national phase application of International Application No. PCT/CN2018/100065, filed Aug. 10, 2018, the content of which is incorporated herein by reference for all purposes.

TECHNICAL FIELD

The present disclosure relates to the field of communication technology, and in particular, to methods, devices, a vehicle user equipment (UE), and terminals of transmitting and receiving a reference signal.

BACKGROUND

In the LTE Vehicle-to-Everything (V2X) technology, for example, in an application scenario of Vehicle-to-Vehicle (V2V) communication, due to the possibility of two vehicles meeting each other, the speed of one vehicle with respect to another vehicle is almost two times of its own speed, which makes the Doppler shift larger. To counteract relatively large Doppler shift, in a subframe of 1 ms, each of a Primary Sidelink Synchronization Signal (PSSS) and a Secondary Sidelink Synchronization Signal (SSSS) of V2X occupies two symbols, and a Physical Sidelink Broadcast Channel (PSBCH) occupies 5 symbols, and among them, 3 symbols of Demodulation Reference Signal (DMRS) are transmitted in a manner of time division to demodulate the PSBCH. In addition, a subframe of 1 ms contains two slots, each of which contains 7 symbols. Among these 14 symbols, the first symbol is used for Automatic Gain Control (AGC), that is, for adjusting power gain of a device to receive PSSS/SSSS/PSBCH, and the last symbol is used to counteract transmission and reception delay caused by devices at different positions. And a period for transmitting the synchronization signal and the broadcast channel is 160 ms, that is, 1 ms of every 160 ms is used to transmit a frame structure of synchronization signal and broadcast channel. In addition, because the LTE sidelink has a feature similar to LTE uplink and Single-carrier Frequency-Division Multiple Access (SC-FDMA) is used in the uplink, the DMRS and the PSBCH are transmitted at different symbols.

On the spectrum of the New Radio (NR) Access technology, each time slot (slot) includes 14 symbols, and how many slots are contained in 1 millisecond (ms) is determined by a subcarrier spacing. For example, in a case that the subcarrier spacing is 15 kilohertz (KHz), there is 1 slot in 1 ms; in a case that the subcarrier spacing is 30 KHz, there are 2 slots in 1 ms; and in a case that the subcarrier spacing is 60 KHz, there are 4 slots in 1 ms, and so on.

In the NR, in order to reduce the always-on reference signal and thereby reduce the overhead, a Synchronization Signal Block (SSB) is proposed. Each SSB occupies 4 consecutive symbols, which are, in sequence, a Primary Synchronization Signal (PSS), a Physical Broadcast Channel (PBCH), a Secondary Synchronization Signal (SSS) and a PBCH, respectively, wherein, 12 resource blocks (RB) in a symbol in which the SSB is located are the SSS, and 4 RBs on respective sides are the PBCH, and some subcarriers in the PBCH are Demodulation Reference Signals (DMRS). A subcarrier spacing of the synchronization signal block may be 15 KHz, 30 KHz, 120 KHz and 240 KHz. All synchronization signal blocks are transmitted within 5 ms. In order to support beam transmission, in a case that there are beams, each beam needs to transmit SSBs, so the maximum number of synchronization signal blocks that can be transmitted within 5 ms is 4 (in a case that the carrier frequency is below 3 GHz) or 8 (in a case that the carrier frequency is 3 GHz-6 GHz) or 64 (in a case that the carrier frequency is above 6 GHz), and the plurality of SSBs within 5 ms are referred to as an SSB burst set. A period for transmitting an SSB burst set may be 5 ms, 10 ms, 20 ms, 40 ms, and etc.

V2X technology has further been introduced into a 5G NR system, but transmission of synchronization signals and broadcast channels has not been defined yet.

SUMMARY

According to a first aspect of the present disclosure, there is provided a method of transmitting a reference signal. The method includes that a vehicle UE determines transmission configuration information of a synchronization signal block in a new radio-vehicle-to-everything (NR-V2X) system (VSSB). The transmission configuration information includes a transmission period of the VSSB, and a time domain position of a VSSB transmission time window within the transmission period. The method additionally includes that the vehicle UE transmits one or more VSSBs within the VSSB transmission time window that occurs periodically according to the transmission configuration information. Each of the one or more VSSBs includes a PSSS, an SSSS, a PSBCH signal, and a DMRS.

According to a second aspect of the present disclosure, a method of receiving a reference signal is provided. The method includes that a receiving terminal detects a VSSB in an NR-V2X system transmitted from a vehicle UE, obtains VSSB index information from a target VSSB detected; determines a time domain position of the target VSSB according to the VSSB index information; and performs a time domain synchronization with the vehicle UE according to the time domain position.

According to a third aspect of the present disclosure, a vehicle UE is provided. The vehicle UE includes a processor and a memory configured to store instructions executable by the processor. The processor is configured to determine transmission configuration information of a VSSB in an NR-V2X system. The transmission configuration information includes a transmission period of the VSSB, and a time domain position of a VSSB transmission time window within the transmission period. The processor is further configured to transmit one or more VSSBs within the VSSB transmission time window that occurs periodically according to the transmission configuration information. Each VSSB includes a PSSS, an SSSS, a PSBCH signal, and a DMRS.

According to a fourth aspect of the present disclosure, a terminal is provided. The terminal includes a processor and a memory configured to store instructions executable by the processor. The processor is configured to detect a VSSB in an NR-V2X system transmitted by vehicle UE, obtain VSSB index information from a target VSSB detected; determine a time domain position of the target VSSB according to the VSSB index information; and perform a time domain synchronization with the vehicle UE according to the time domain position.

According to a fifth aspect of the present disclosure, a non-transitory computer-readable storage medium having stored therein computer instructions that, when executed by a processor, cause the processor to implement operations of any method according to the first aspect of the present disclosure.

According to a sixth aspect of the present disclosure, a non-transitory computer-readable storage medium having stored therein computer instructions that, when executed by a processor, cause the processor to implement operations of any method according to the second aspect of the present disclosure.

The present disclosure designs methods of transmitting a reference signal for 5G NR-V2X systems. The vehicle UE can transmit reference signals in a structure of synchronization signal block VSSBs to receiving terminals in different directions through a plurality of beams, such that the receiving terminal can perform, after receiving VSSBs transmitted by the vehicle UE, a time domain synchronization quickly with the vehicle UE according to a reference signal of the VSSB and index information carried by the VSSB, which increases efficiency of time domain synchronization between the receiving terminal and the vehicle UE and decreases time for signal synchronization, thereby guaranteeing the immediacy of communication between the vehicle UE and the receiving terminal.

It should be understood that the above general description and the following detailed description are only exemplary and explanatory, and cannot be construed as a limit to the present disclosure.

BRIEF DESCRIPTION OF THE DRAWINGS

The figures herein are incorporated into the specification and constitute a part of the specification, illustrate embodiments in accordance with the present disclosure, and are used together with the specification to explain the principle of the present disclosure.

DETAILED DESCRIPTION OF THE EMBODIMENTS

Exemplary embodiments will be described in detail here, and examples thereof are illustrated in the accompanying figures. When the following description refers to the accompanying figures, unless indicated otherwise, the same reference sings in different figures designates the same or similar elements. Implementation manners described in the following exemplary embodiments do not represent all implementation manners consistent with the present invention. Rather, they are merely examples of devices and methods consistent with some aspects of the present invention as set forth in the appended claims.

The terms used in the present disclosure are only for the purpose of describing specific embodiments, and are not intended to limit the present disclosure. The singular forms "a", "said" and "the" used in the present disclosure and appended claims are also intended to include plural forms, unless the context clearly indicates other meanings. It should also be understood that the term "and/or" used herein refers to and includes any or all possible combinations of one or more associated listed items.

It should be understood that although the terms "first", "second", "third", etc. may be used in this disclosure to describe various information, the information should not be limited to these terms. These terms are only used to distinguish information of same type from each other. For example, without departing from the scope of the present disclosure, the first information may also be referred to as second information, and similarly, the second information may also be referred to as first information. Depending on the context, the word "if" as used herein can be interpreted as "when" or "when" or "in response to determination".

Figure 1:
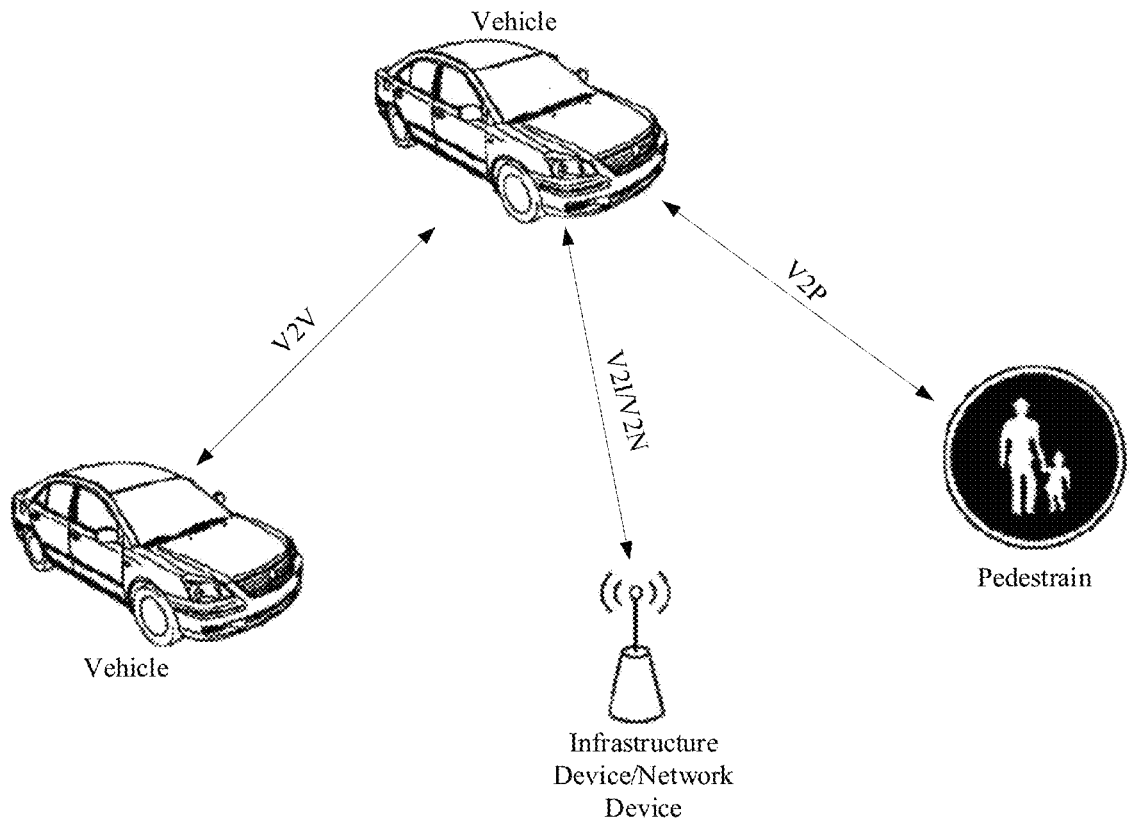
FIG. 1 is a schematic view illustrating an application scenario of an NR-V2X system according to an exemplary embodiment of the present disclosure.

The executing body involved in the present disclosure includes: vehicle user equipment (UE) and receiving terminals of a new radio-vehicle-to-everything (NR-V2X) system, wherein V2X includes: vehicle-to-vehicle (V2V) communication, Vehicle to Infrastructure (V2I) communication, Vehicle to Nomadic Device (V2N, which represent communication between a vehicle and a mobile terminals of a driver) communication, and Vehicle to Pedestrian (V2P, which means communication between a vehicle to a mobile terminal of a pedestrian) communication. FIG. 1 illustrates an application scenario according to an exemplary embodiment of the present disclosure, wherein a receiving terminal may be a terminal such as a vehicle, a roadside infrastructure device, and a mobile terminal of a pedestrian. In the specific implementation process, the vehicle UE and the receiving terminal are independent of each other, and at the same time, they are connected to each other to jointly implement the technical solutions according to the present disclosure.

Based on the above application scenarios, the present disclosure provides a method of transmitting a reference signal, which dynamically changes transmission characteristics of VSSB to counteract the Doppler shift effect that occurs between a vehicle-borne device and a receiving terminal.

Doppler shift effect, means that when there is relative movement between a transmitting source and a receiving end, a frequency at which the transmitting source transmits information is different from a frequency at which the receiving end receives the information transmitted by the transmitting source. This phenomenon is called Doppler shift effect. The difference between the transmitting frequency and the receiving frequency is called the Doppler frequency shift. In real life, in a case of wireless communication on a fast moving objects (such as high-speed rail), phenomenons such as signal quality degradation occurs, which is an example of Doppler shift in electromagnetic waves.

Figure 2:
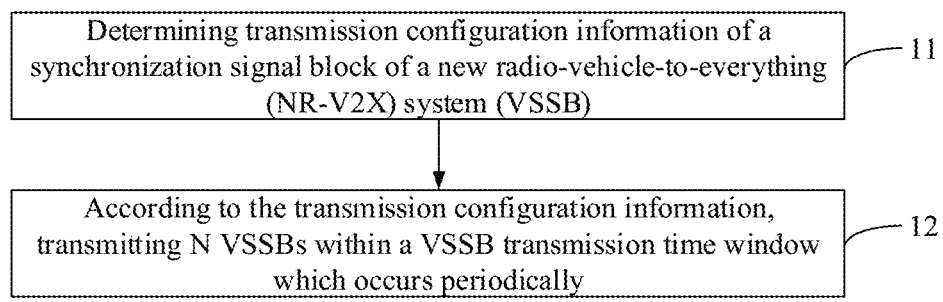
FIG. 2 is a flowchart illustrating a method of transmitting a reference signal according to an exemplary embodiment of the present disclosure.

FIG. 2 is a flowchart illustrating a method of transmitting a reference signal according to an exemplary embodiment of the present disclosure. The method is applicable to vehicle user equipment (UE), and includes following steps:

In step 11, transmission configuration information of a synchronization signal block of a new radio-vehicle-to-everything (NR-V2X) system (VSSB) is determined. The transmission configuration information includes: a transmission period of the VSSB and a time domain position of a VSSB transmission time window within the transmission period.

In the present disclosure, an SSB used in the NR-V2X system is abbreviated as VSSB. wherein, each VSSB includes: a primary sidelink synchronization signal (PSSS), a secondary sidelink synchronization signal (SSSS), a physical sidelink broadcast channel (PSBCH) signal, and a demodulation reference signal (DMRS).

In step 12, according to the transmission configuration information, N VSSBs are transmitted within a VSSB transmission time window which occurs periodically, where N is an integer greater than or equal to 1.

Assuming that the transmission period of the aforementioned VSSB is 160 ms, a VSSB transmission time window is set at a fixed position of each transmission period in the present disclosure. For example, a transmission window with a duration of 5 ms is set at the 50 ms position of 160 ms, and a position of the VSSB transmission time window within the SVVB transmission window may be expressed as 50 ms-54 ms.

In the present disclosure, in response to that a VSSB transmission time window arrives, the vehicle-borne device transmits N VSSBs though a beam.

In this disclosure, before transmitting the VSSBs, vehicle UE may predict a possible Doppler frequency shift based on speed information of the vehicle UE, and then changes a reference signal time domain density for the VSSBs to counteract the Doppler shift effect, thereby guaranteeing that the VSSB transmitted by the vehicle-borne device can be detected by a receiving terminal.

Figure 3:
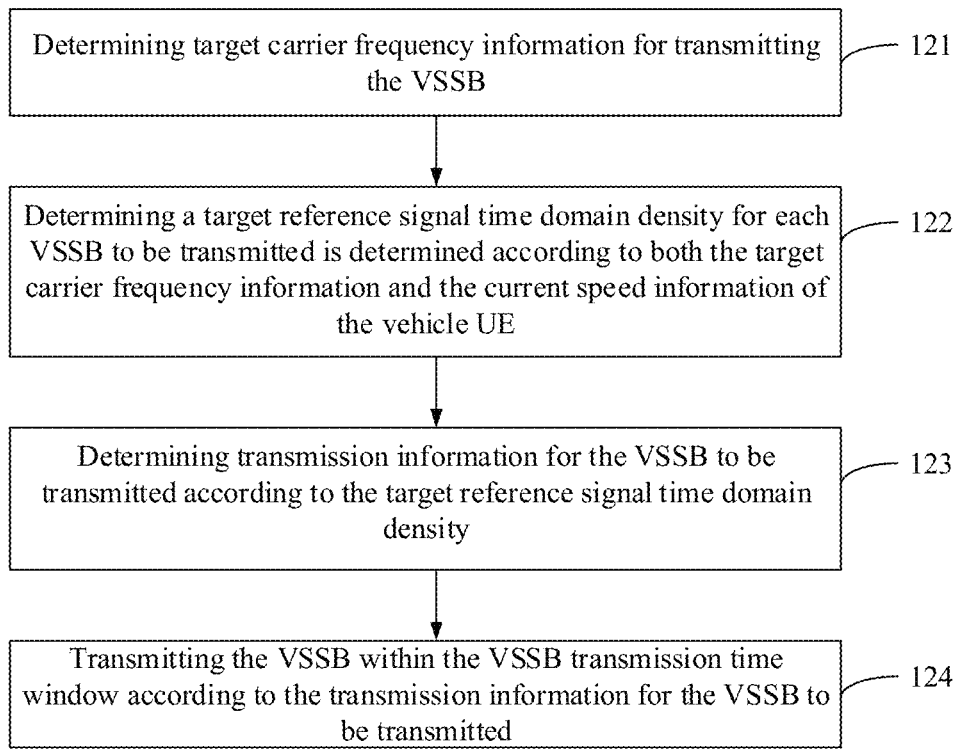
FIG. 3 is a flowchart illustrating a method of transmitting a reference signal according to another exemplary embodiment of the present disclosure.

Referring to FIG. 3, which is a flowchart illustrating a method of transmitting a reference signal according to another exemplary embodiment, the step 12 may include:

In step 121, target carrier frequency information for transmitting the VSSB is determined;

wherein the target carrier frequency information includes: a frequency band and a bandwidth of a carrier frequency for transmitting the VSSBs.

In the present disclosure, the vehicle UE may determine the target carrier frequency information for transmitting the VSSBs in any one of:

Manner 1: determining the target carrier frequency information according to preset resource configuration information.

For example, carrier frequency information for transmitting VSSB is pre-stored in a chip of the vehicle UE, and the vehicle UE may directly read target carrier frequency information from the chip.

Figure 4:
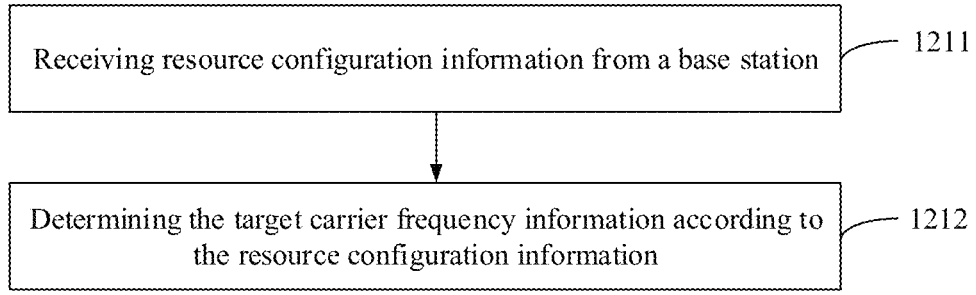
FIG. 4 is a flowchart illustrating a method of transmitting a reference signal according to another exemplary embodiment of the present disclosure.

Manner 2: Determining the target carrier frequency information according to resource configuration information issued by the base station Referring to FIG. 4, which is a flowchart illustrating a method of transmitting a reference signal according to another exemplary embodiment, the foregoing step 121 may include:

In step 1211, resource configuration information is received from a base station, where the resource configuration information is configured to instruct the vehicle-borne device to transmit the VSSB with configured resource.

As mentioned above, in the present disclosure, VSSB is transmitted with preset resources configured by the base station. In an embodiment of the present disclosure, resource blocks that the base station configures for the vehicle UE is located at a same carrier frequency as resources used by the base station, then, the resource configuration information does not need to indicate any carrier frequency band information, but only indicates position information of a resource block (RB).

In response to that resource block that the base station configures for the vehicle-borne device and resource used by the base station are positioned at different carrier frequencies, the resource configuration information is required to indicate both carrier frequency band information and resource block position information.

In step 1212, the target carrier frequency information is determined according to the resource configuration information.

Correspondingly, in response to that the vehicle UE only obtains resource block position information from the above resource configuration information, according to the protocol, the current working carrier frequency for communicating with the base station is determined as the above target carrier frequency for transmitting VSSB.

In another embodiment, the vehicle UE determines the target carrier frequency according to the carrier frequency band information notified by the base station.

In the present disclosure, the frequency band of the carrier frequency configured by the system for transmitting VSSB may include: frequency bands below 3 GHz, 3 GHz-6 GHz, and above 6 GHz.

In step 122, a target reference signal time domain density for each VSSB to be transmitted is determined according to both the target carrier frequency information and the current speed information of the vehicle UE.

In the present disclosure, the reference signal time domain density may be expressed as a ratio of the total number of symbols occupied by the reference signal to a duration occupied a VSSB, wherein the reference signal includes: a primary sidelink synchronization signal (PSSS), a secondary sidelink synchronization signal (SSSS) and a demodulation reference signal (DMRS). The higher the reference signal time domain density is, the greater the Doppler shift can be counteracted.

In the present disclosure, the current speed information of the vehicle UE may include: a current speed of the vehicle where the vehicle UE is located; or, a relative speed between the vehicle UE and a target receiving terminal.

The Doppler frequency shift may be estimated according to the current speed information, and then the reference signal time domain density for the VSSB is adjusted so as to counteract the Doppler frequency effect.

Figure 5:
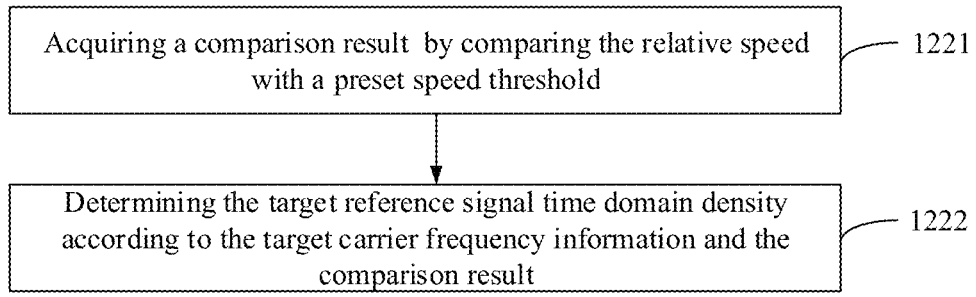
FIG. 5 is a flowchart illustrating a method of transmitting a reference signal according to another exemplary embodiment of the present disclosure.

Referring to FIG. 5, which is a flowchart illustrating a method of transmitting a reference signal according to another exemplary embodiment, the foregoing step 122 may include:

In step 1221, a comparison result is acquired by comparing the relative speed with a preset speed threshold;

In step 1222, the target reference signal time domain density is determined according to the target carrier frequency information and the comparison result.

In the embodiments of the present disclosure, time domain density levels may be used to indicate reference signal time domain densities with different magnitudes, and the higher the level, the greater corresponding reference signal time domain density.

In the NR-V2X system, for each carrier frequency band, such as 3 GHz, a preset number of reference signal time domain density levels may be agreed in the protocol, and each time domain density level corresponds to a preset speed matching condition.

In response to the target carrier frequency, a correspondence between the time domain density level and the preset speed matching condition may be determined according to the protocol.

Taking the target frequency band of 3 GHz frequency band as an example, it is assumed that, for the 3 GHz frequency band, two speed thresholds, namely V10 and V20, are set in the system, wherein V10 is less than V20; and the two speed thresholds correspond to different reference signal time domain density levels, respectively. Exemplarily, as illustrated in Table I:

TABLE I

| Speed matching condition | Time domain density level |
| --- | --- |
| V < V10 | First level |
| V10 ≤ V ≤ V20 | second level |
| V > V20 | Third level |

The vehicle UE may compare the currently determined relative speed with the respective speed thresholds as illustrated in Table I to determine which speed matching condition the current relative speed falls into, and thus determine a required reference signal time domain density level.

In step 123, transmission information for the VSSB to be transmitted is determined according to the target reference signal time domain density. The transmission information includes: a target subcarrier spacing for transmitting the VSSB and a structure of the VSSBs to be transmitted. The structure of VSSBs to be transmitted involves: the number of symbols occupied by each signal and positions of the symbols occupied;

In the present disclosure, a reference signal time domain density level for a VSSB is related to both the subcarrier spacing for transmitting the VSSB and the total number of time domain units such as symbols occupied by the reference signal in a signal structure of the VSSB.

In the NR-V2X system, there may be a plurality of available subcarrier spacings for a carrier frequency. For example, in the frequency band below 6 GHz, the subcarrier spacings that the system may use to transmit VSSBs include: 15 KHz, 30 KHz, and 60 KHz. For frequency bands above 6 GHz, the sub-carrier spacings that the system may use to transmit VSSBs include: 120 KHz, 240 KHz, and 480 KHz. The higher the frequency band to which the target carrier frequency of the vehicle UE belongs, the greater the subcarrier spacing for transmitting VSSBs. For example, a subcarrier spacing that may be used in a case that the target carrier frequency is 6 GHz should be greater than or equal to a subcarrier spacing that may be used in a case that the target carrier frequency is 3 GHz. For example, 15 KHz or 30 KHz may be used at 3 GHz, and 30 KHz or 60 KHz may be used at 6 GHz.

Still taking the target carrier frequency determined in step 121 above being 3 GHz frequency band as an example, supposing that it is agreed in the system that an available subcarrier spacing for the 3 GHz frequency band includes: 15 KHz and 30 KHz; and meanwhile, it is also agreed in the system that two VSSB structures, which are expressed as a first VSSB structure and a second VSSB, may be used in this frequency band, wherein a symbol ratio of a reference signal in the second VSSB structure is greater than a symbol ratio of a reference signal in the first VSSB structure.

TABLE II

| Subcarrier Spacing | VSSB Structure | Time domain density level |
|---|---|---|
| 15 KHz | First VSSB structure | First level |
| | Second VSSB structure | second level |
| 30 KHz | First VSSB structure | |
| | Second VSSB structure | Third level |

Exemplarily, it is supposed that the vehicle UE determines that it is necessary to increase the reference signal time domain density level for the VSSB to be transmitted from the first level to the second level according to a current relative speed.

In the present disclosure, a VSSB structure used by the vehicle UE before adjusting the reference signal time domain density may be referred to as an original VSSB structure. In a case that the vehicle UE transmits VSSBs with the first-level reference signal time domain density, the adopted subcarrier spacing is 15 KHz. In a case that it is agreed that 3 GHz frequency band is used in the system, at 15 KHz, a VSSB is provided in a time slot, and is supposed that an original VSSB structure used by the vehicle-borne device is the first VSSB structure.

Figure 6A:
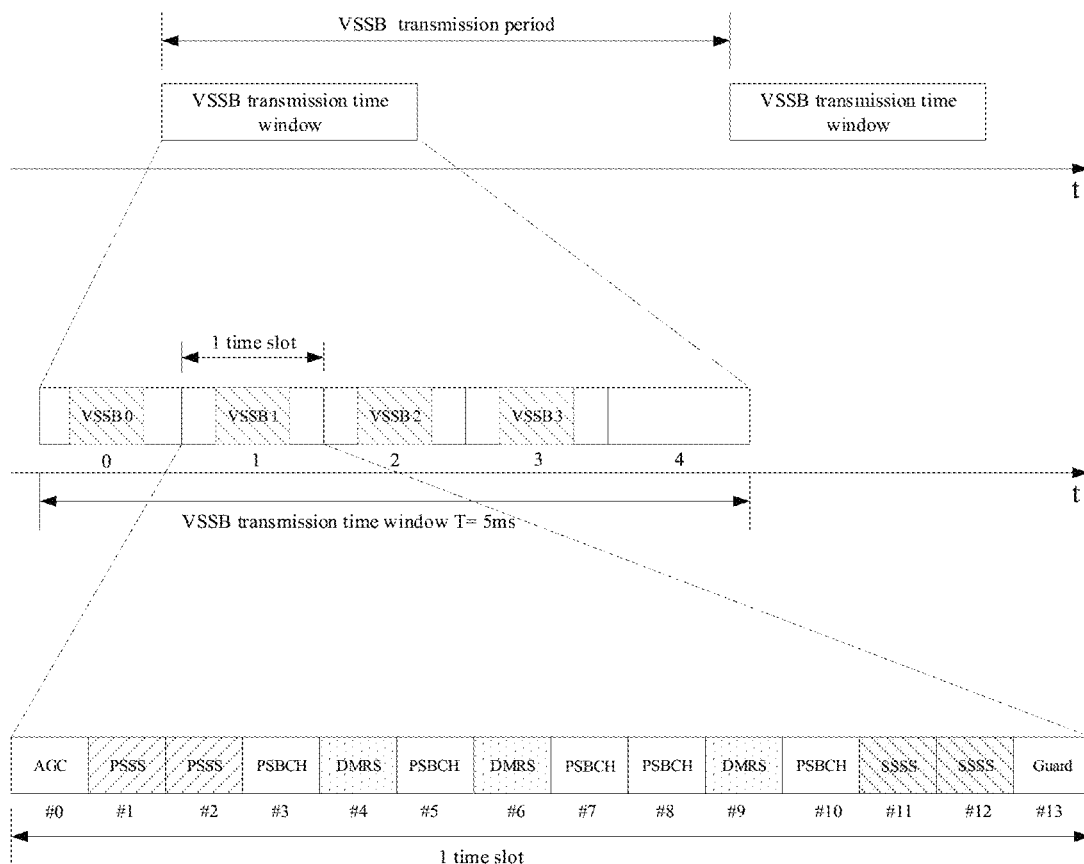
FIG. 6A is a schematic diagram illustrating an application scenario of transmitting a reference signal according to an exemplary embodiment of the present disclosure.

Exemplarily, the first VSSB structure used by the vehicle UE may be as illustrated in FIG. 6A, where the number of symbols occupied by PSSS is 2, the number of symbols occupied by SSSS is 2, the number of symbols occupied by PSBCH is 5, and the number of symbols occupied by DMRS. The number of symbols is 3.

Then the vehicle UE may increase the reference signal time domain density for the VSSB to be transmitted to the second level through at least one of:

Manner 1: the second VSSB structure with a larger reference signal is adopted without changing the used subcarrier spacing.

Figure 6B:
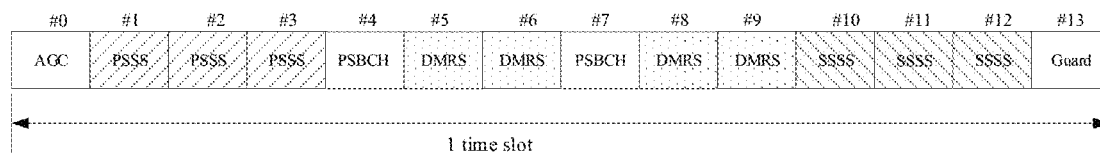
FIG. 6B is a schematic diagram illustrating an application scenario of transmitting a reference signal according to another exemplary embodiment of the present disclosure.

Exemplarily, with respect to the first VSSB structure as illustrated in FIG. 6A, the second VSSB structure in the present disclosure may be designed in any one of:

In a first design, compared with the first VSSB structure, the number of symbols occupied by at least one reference signal is increased and the number of symbols occupied by PSBCH is reduced in a case that a duration of the VSSB remains unchanged. As the structure diagram of VSSB illustrated in FIG. 6B, the number of symbols occupied by PSSS is 3, the number of symbols occupied by SSSS is 3, the number of symbols occupied by PSBCH is 2, and the number of symbols occupied by DMRS is 4.

In a second design, compared with the first VSSB structure, the number of symbols occupied by DMRS is increased in a FDM manner in a case that a duration of the VSSB remains unchanged. For example, in a case of designing a structure of the second VSSB in the embodiments of the present disclosure, a portion of resource blocks corresponding to the symbols occupied by each or part of the PSBCHs, such as #3, #5, #7, #8, #10, are allocated to carry DMRS signals, as illustrated in F 6C, thereby increasing the number of symbols occupied by DMRS. Compared with the first VSSB structure, the proportion of reference signals is increased, that is, a ratio of the number of the symbols occupied by reference signals to the duration of the VSSB, thereby increasing the reference signal time domain density.

Manner 2: Without changing the VSSB structure, increasing the subcarrier spacing for transmitting VSSB at the target carrier frequency In the present disclosure, in a case that it is agreed in the protocol that there are a plurality of subcarrier spacings for the target carrier frequency, without changing the structure of the VSSB, the reference signal time domain density for the VSSB may be increased by increasing the subcarrier spacing.

As in the above example, 15 KHz is adopted, 1 ms corresponds to one time slot, and a VSSB transmission time window of 5 ms includes 5 time slots. Assuming that the vehicle UE is to transmit four VSSBs, in a case that it is agreed in the system a VSSB is set in one slot at 15 KHz in the 3 GHz frequency band, the VSSBs to be transmitted as illustrated in FIG. 6A, where VSSB0, VSSB1, VSSB2, and VSSB3 respectively represent index information of each VSSB to be transmitted.

Figure 6C:
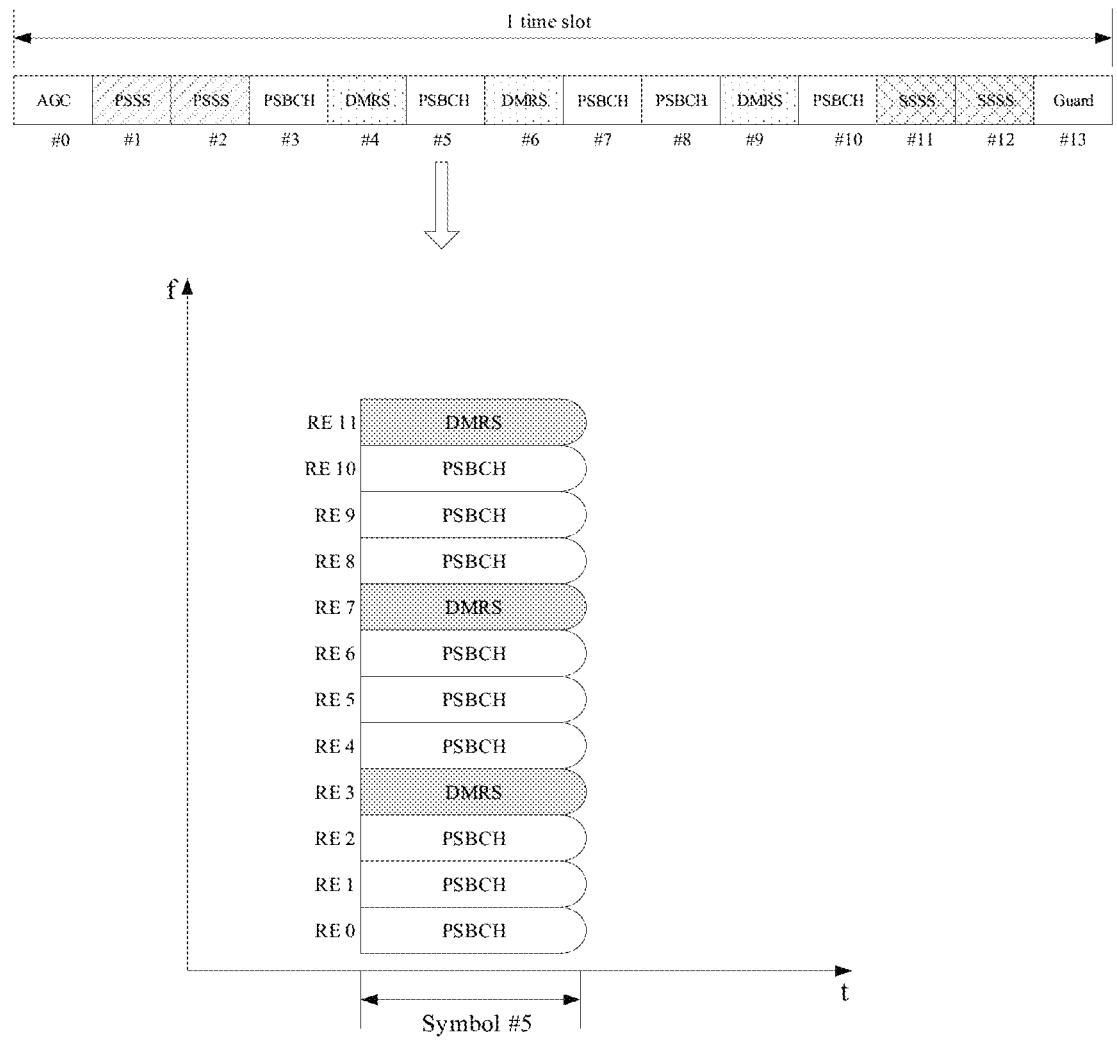
FIG. 6C is a schematic diagram illustrating an application scenario of transmitting a reference signal according to another exemplary embodiment of the present disclosure.
Figure 6D:
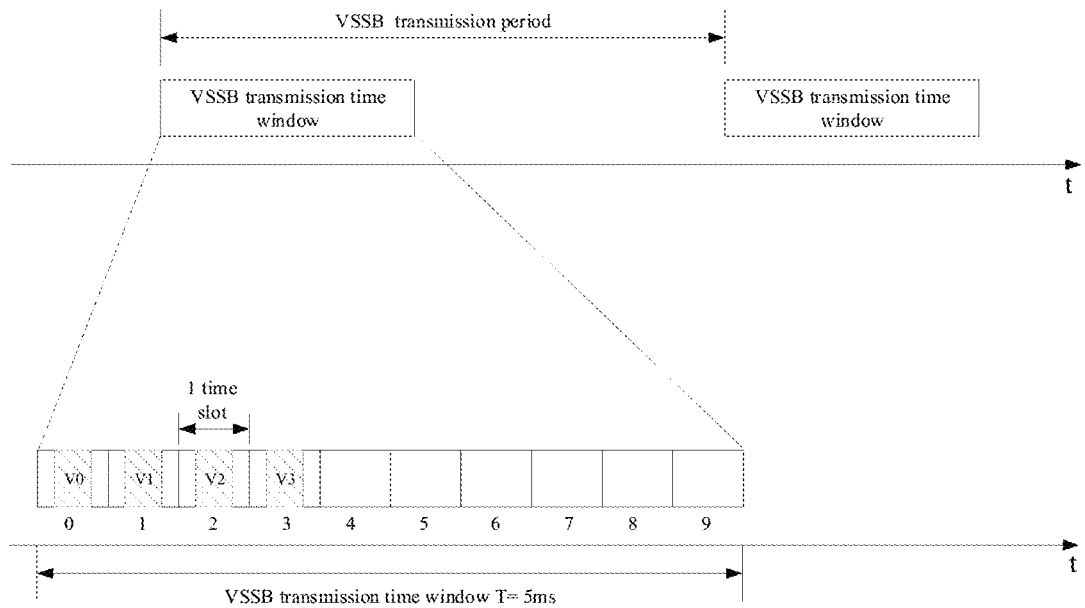
FIG. 6D is a schematic diagram illustrating an application scenario of transmitting a reference signal according to another exemplary embodiment of the present disclosure.

In a case that the target subcarrier spacing is increased to 30 KHz, 1 ms corresponds to 2 time slots, that is, a duration of 1 time slot is shortened to 0.5 ms. Since position and the number of symbols occupied by VSSB in a time slot remain unchanged, a duration of a single VSSB is reduced to half of the time illustrated in FIG. 6A, as illustrated in FIG. 6D, where V0, V1, V2, and V3 represent index information of each VSSB, which is same to VSSB0, VSSB1, VSSB2, and VSSB3 as illustrated in FIG. 6A.

Since the number of symbols occupied by the reference signal of the VSSB remains unchanged, and the duration of one VSSB is reduced, the ratio of the number of symbols occupied by the reference signal in VSSB to a duration occupied by the VSSB becomes larger, so as to increase the reference signal time domain density by increasing the target subcarrier spacing, thereby counteracting greater Doppler frequency shift.

So far, both the target subcarrier spacing and the target VSSB structure required by the target reference signal time domain density are determined, that is, transmission information for a single VSSB to be transmitted is determined.

The above embodiments are described by taking that the reference signal time domain density is required to be increased as an example. On the contrary, in a case where the reference signal time domain density needs to be reduced, opposite operations may be performed, which will not be elaborated herein.

In the present disclosure, when the vehicle speed changes significantly, the vehicle UE may adjust in time the reference signal time domain density for the VSSB to be transmitted through at least one of the above methods, thereby effectively counteracting Doppler shift and ensuring instant communication between the vehicle-mounted equipment and a receiving terminal.

In step 124, the VSSB is transmitted within the VSSB transmission time window according to the transmission information for the VSSB to be transmitted.

In the present disclosure, in a case that the vehicle UE transmits an VSSB to a receiving terminal within the VSSB transmission time window, it also needs to carry index information of occupied effective unit time domain resources, so that the receiving terminal may perform a time domain synchronization with the vehicle UE according to the index information.

Figure 7:
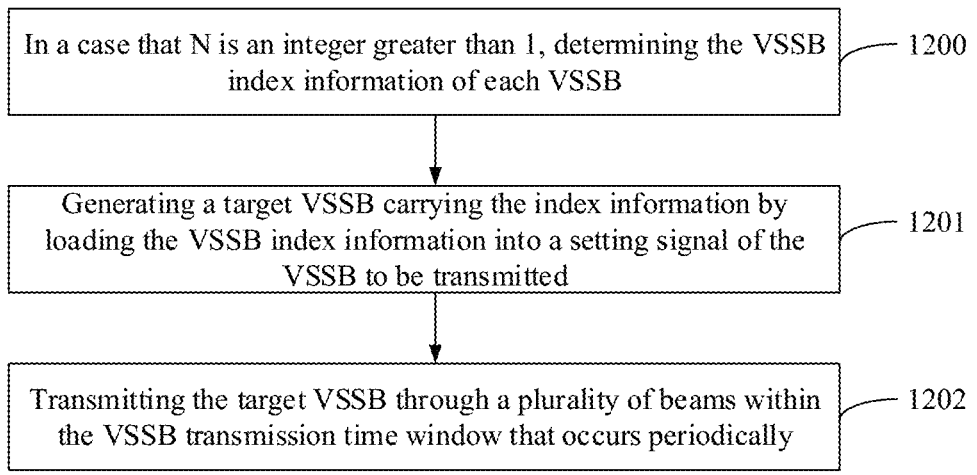
FIG. 7 is a flowchart illustrating a method of transmitting a reference signal according to another exemplary embodiment of the present disclosure.

Referring to FIG. 7 which is a flowchart illustrating a method of transmitting a reference signal according to another exemplary embodiment, the step 12 may include:

In step 1200, in a case that N is an integer greater than 1, the VSSB index information of each VSSB is determined;

In a case that the target carrier frequency and the subcarrier spacing, with which the vehicle UE transmits a VSSB, are determined, the position and index information of each unit time domain resource within a VSSB transmission time window are agreed by the system, as illustrated in FIG. 6A.

VSSB0, VSSB1, VSSB2, and VSSB3 are determined in accordance with the system protocol.

In step 1201, a target VSSB carrying the index information is generated by loading the VSSB index information into a setting signal of the VSSB to be transmitted;

In the embodiment illustrated in FIG. 6A, for a VSSB to be transmitted at the position of VSSB3, the vehicle UE may carry index information VSSB3 in a setting signal of the VSSB, such as a DMRS signal and/or a PSBCH signal, and transmit it to the receiving terminal.

In the present disclosure, the index information of the VSSB to be transmitted may be loaded into the setting signal of the VSSB to be transmitted through any of:

Manner 1: the index information of the VSSB to be transmitted may be indicated by a corresponding DMRS target sequence;

Taking four pieces of index information included in a VSSB transmission time window illustrated in FIG. 6A as an example, in the present disclosure, a correspondence between index information and a DMRS sequence may be agreed in the system, for example, as illustrated in Table III:

TABLE III

| Index information | DMRS sequence |
|---|---|
| VSSB 0 | * |
| VSSB 1 | ** |
| VSSB 2 | *** |
| VSSB 3 | **** |

Referring to Table III, the vehicle UE may load the sequence "**" corresponding to VSSB3 into the DMRS signal of the VSSB. The above index information VSSB 3 is indicated by the DMRS sequence "**".

Manner 2: index information of the VSSB to be transmitted is loaded into a first bit of a PSBCH signal.

In another embodiment of the disclosure, the index information can be loaded into a reserved information bit or a new information bit of the PSBCH signal, which is referred to as the first bit in the present disclosure. For example, the bit value 11 of the VSSB 3 is set in the 2 reserved bits or new bits of the PSBCH signal to indicate the index information.

Manner 3: Indicating a part of bit values of the index information of the VSSB to be transmitted by a corresponding DMRS target sequence, and loading remaining of the bit values into a second bit of the PSBCH signal.

In another embodiment of the disclosure, the index information may further be indicated by a combination of a DMRS target sequence and bit information set in the PSBCH signal.

As still in the above example, corresponding bit values of the index information VSSB 3 are 11. In the embodiment of the present disclosure, the bit value of the lower bit "1" may be indicated by the preset DMRS target sequence such as "*", and the bit value of the higher bit "1" is placed in a reserved bit or a new bit of the PSBCH signal. In the present disclosure, the reserved bit or the new bit of the PSBCH signal which is used to carry partial index information is referred to as the second bit. In another embodiment of the present disclosure, it may be further agreed in the system that a bit value of a higher bit of the index information is indicated by a DMRS target sequence, and correspondingly, a remaining bit value is indicated by the second bit of the PSBCH signal, which is not limited in the present disclosure.

In the present disclosure, a VSSB which carries VSSB index information is referred to as a target VSSB.

In step 1202, the target VSSB is transmitted through a plurality of beams within the VSSB transmission time window that occurs periodically.

In the present disclosure, a beam is used to transmit the target VSSB in different directions at different times. For example, in the example as illustrated in FIG. 6A, at a time domain position corresponding to a first time slot VSSB0 of 5 ms, a beam is used to transmit the target VSSB carrying index information VSSB 0 in one direction. And at a time domain position corresponding to a third time slot VSSB 2, a beam is used to transmit the target VSSB carrying the index information VSSB 2 in another direction; and so on.

In addition, in the present disclosure, regarding how the vehicle UE transmits a PSBCH signal and a DMRS signal of a VSSB within the VSSB transmission time window, the present disclosure may propose the following three transmission modes:

In a first transmission mode, a PSBCH signal and a DMRS signal of a VSSB are transmitted in Time Division Multiplexing (TDM) mode, that is, the PSBCH signal and the DMRS signal are transmitted in time-frequency resources corresponding to different symbols. In this mode, frequency domains of the PSBCH signal and the DMRS signal may be the same, but the time domains of the PSBCH signal and the DMRS signal are different.

In a second transmission mode, a PSBCH signal and a DMRS signal of a VSSB are transmitted in Frequency Division Multiplexing (FDM) mode, that is, the PSBCH signal and the DMRS signal may be transmitted in different frequency domain resources corresponding to a same symbol. In this mode, the time domain of the PSBCH signal and the DMRS signal may be the same, but the frequency domains of the PSBCH signal and the DMRS signal are different.

In a third transmission mode, the PSBCH signal and the DMRS signal are transmitted in a combined manner of TDM and FDM. As illustrated in FIG. 6C, in time-frequency resources corresponding to a symbol occupied by the PSBCH signal such as symbol #5, some resources, such as RE #3, RE #7, RE #11 of twelve Resource Elements (RE) included in an RB, are used to transmit the DMRS signal, and remaining of the REs are used to transmit the PSBCH signal. In addition, the DMRS signal is also transmitted in time-frequency resource corresponding to symbol #6. In the symbols with both PSBCH and DMRS, a proportion of REs occupied by DMRS may be ⅓ or ¼, and the like.

In the present disclosure, the base station may transmit the above-mentioned resource configuration information to the vehicle UE and the receiving terminal through a broadcast signaling, a high-level signaling, and a physical layer signaling. The high-level signaling may be a Radio Resource Control (RRC) signaling, a Medium Access Control (MAC) Control Element (CE) signaling, and the like.

In summary, a method of transmitting a reference signal for a 5G NR-V2X system is designed in the present disclosure. Vehicle user equipment (UE) may transmit a reference signal via a synchronization signal block VSSB structure to receiving terminals in different directions through beams within a VSSB transmission time window that occurs periodically, so that a receiving terminal may perform, after receiving the VSSB from the vehicle UE, a time domain synchronization with the vehicle UE quickly by using a reference signal for the VSSB and index information carried by the VSSB, thereby improving efficiency of time domain synchronization between the receiving terminal and the vehicle UE, reducing time for signal synchronization, and ensuring immediacy of communication between the vehicle equipment and the receiving terminal.

Correspondingly, embodiments of the present disclosure further provides a method of receiving a reference signal, which is applicable to a receiving terminal of an NR-V2X system.

Figure 8:
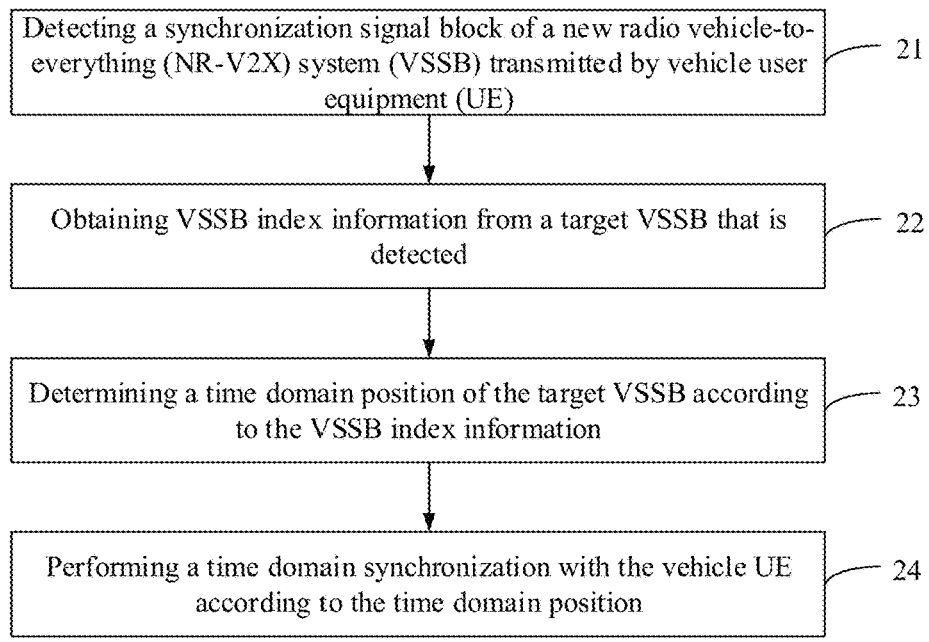
FIG. 8 is a flowchart illustrating a method of receiving a reference signal according to an exemplary embodiment of the present disclosure.

Referring to FIG. 8 which is a flowchart illustrating a method of receiving a reference signal according to an exemplary embodiment, the method may include:

In step 21, detect a synchronization signal block of a new radio vehicle-to-everything (NR-V2X) system (VSSB) transmitted by vehicle user equipment (UE);

In an embodiment of the present disclosure, the receiving terminal may further determine a target carrier frequency information via system agreed carrier information embedded in a chip or by receiving resource configuration information from a base station, wherein the target carrier frequency indicates a carrier frequency at which receiving terminal receives the VSSB from the vehicle UE.

Figure 9:
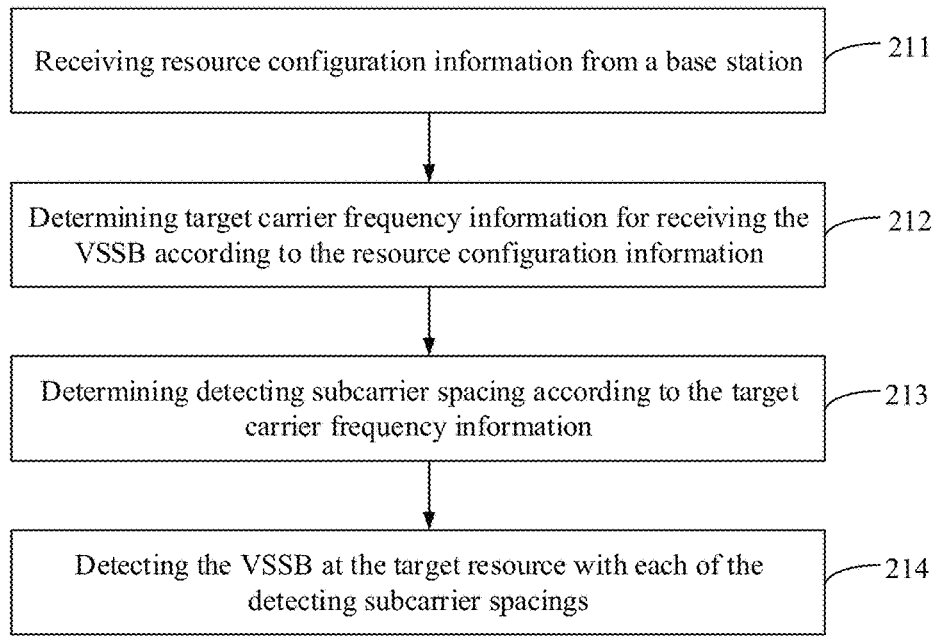
FIG. 9 is a flowchart illustrating a method of receiving a reference signal according to another exemplary embodiment of the present disclosure.

In an embodiment of the present disclosure, referring to FIG. 9, which is a flowchart illustrating a method of receiving a reference signal according to another exemplary embodiment, the step 21 may include:

In step 211, resource configuration information is received from a base station, wherein the resource configuration information is configured to instruct the receiving terminal to receive the VSSB with configured resource.

In step 212, target carrier frequency information for receiving the VSSB is determined according to the resource configuration information.

In the embodiment of the present disclosure, the base station may further transmit resource configuration information to the receiving terminal to inform the receiving terminal which carrier frequency the VSSB transmitted from the vehicle UE is received.

In step 213, detecting subcarrier spacing is determined according to the target carrier frequency information.

It is assumed that the receiving terminal, such as vehicle B, determines that the carrier frequency for receiving VSSB is the carrier frequency of the 3 GHz band. It is provided in the protocol of the system that the carrier frequency of a frequency band can be used with one or more subcarrier spacings, and the receiving terminal may determine each of the available subcarrier spacings as a detecting subcarrier spacing. For example, the detecting subcarrier spacing corresponding to the 3 GHz frequency band may include: 15 KHz, and 30 KHz.

In step 214, the VSSB is detected at the target resource with each of the detecting subcarrier spacings.

As in the above example, the receiving terminal may use 15 KHz and 30 KHz to detect a VSSB, and a detecting subcarrier spacing used in a case that VSSB is detected is determined as a target subcarrier spacing, such as 15 KHz.

In step 22, VSSB index information is obtained from a target VSSB that is detected.

Figure 10:
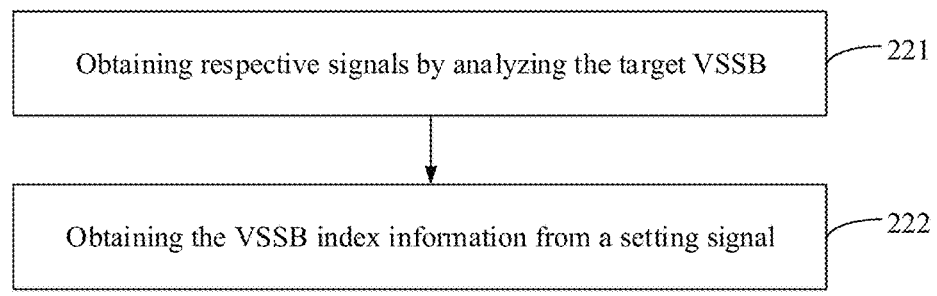
FIG. 10 is a flowchart illustrating a method of receiving a reference signal according to another exemplary embodiment of the present disclosure.

Referring to FIG. 10, which is a flowchart illustrating a method of receiving a reference signal according to another exemplary embodiment, the step 22 may include:

In step 221, respective signals are obtained by analyzing the target VSSB, wherein the respective signals include: a primary sidelink synchronization signal (PSSS), a secondary sidelink synchronization signal (SSSS), a physical sidelink broadcast channel (PSBCH) signal, and a demodulation reference signal (DMRS); and In step 222, the VSSB index information is obtained from a setting signal.

The setting signal may comprise a preset PSBCH signal of the target VSSB, a preset DMRS signal of the target VSSB, or a combination thereof.

Corresponding to the above step 1201, in the present disclosure, the receiving terminal may obtain the VSSB index information from the setting signal of the target VSSB in any one of:

Manner 1: The VSSB index information is obtained from information carried by the preset DMRS sequence;

Exemplarily, assuming that DMRS sequence carried by the preset DMRS signal is ****, and a correspondence between index information and a DMRS sequence under the condition of the 3 GHz frequency band and the subcarrier spacing of 15 KHz agreed by the system is queried, as illustrated in the Table III, it can be determined that the index information of the target VSSB is VSSB 3.

Manner 2: The VSSB index information is obtained by analyzing a first bit of the preset PSBCH signal.

Corresponding to the second manner of step 1201, exemplarily, in a case that it is detected that information bit value of a preset bit of the preset PSBCH signal of the target VSSB, that is, a first bit, is 11, it is determined that VSSB index information carried by the target VSSB is VSSB 3.

Figure 11:
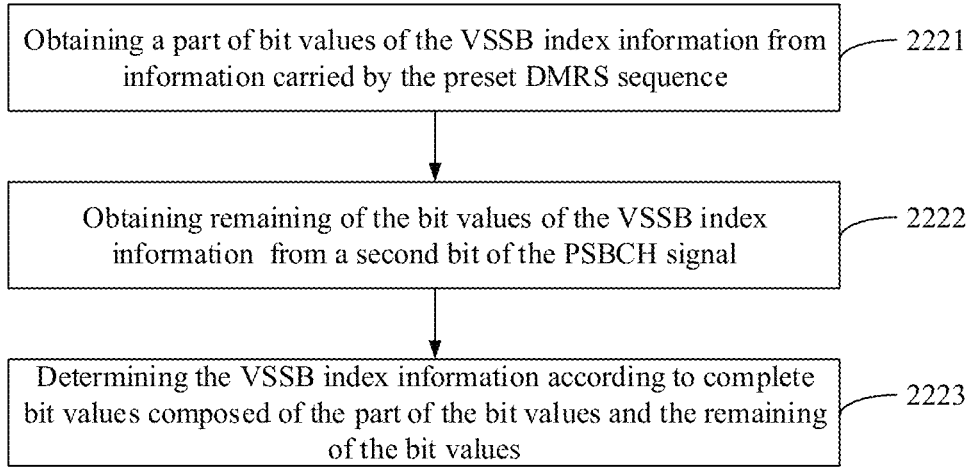
FIG. 11 is a flowchart illustrating a method of receiving a reference signal according to another exemplary embodiment of the present disclosure.

Manner 3: The VSSB index information is obtained from both the preset PSBCH signal and the preset DMRS signal Referring to FIG. 11, which is a flowchart illustrating a method of receiving a reference signal according to another exemplary embodiment, the step 222 may include:

In step 2221, a part of bit values of the VSSB index information is obtained from information carried by the preset DMRS sequence;

In step 2222, remaining of the bit values of the VSSB index information is obtained from a second bit of the PSBCH signal; and In step 2223, the VSSB index information is determined according to complete bit values composed of the part of the bit values and the remaining of the bit values.

Corresponding to the third manner of step 1201, in a case that a bit value of the DMRS sequence carried by the preset DMRS signal of the target VSSB is 1, the bit value obtained from the second bit of the preset PSBCH signal of the target VSSB is 1. In a case that it is agreed in the system that the DMRS sequence carried by the preset DMRS signal indicates a high bit value of the bit values of the VSSB index information and a value of the second bit of the preset PSBCH signal indicates a lower bit value of the bit values of the VSSB index information, Then, according to the information carried by the preset DMRS sequence and the second bit value of the preset PSBCH signal, it is determined that the complete bit value of the VSSB index information of the target VSSB is 11, thereby determining that the VSSB index information of the target VSSB is VSSB 3.

In step 23, a time domain position of the target VSSB is determined according to the VSSB index information;

Specifically, the receiving terminal determines the time domain position of the target VSSB according to the VSSB index information, the target carrier frequency information, and the target subcarrier spacing. Still taking the target carrier frequency of 3G Hz, target subcarrier spacing of 15 KHz, and VSSB index information of VSSB 3 as an example, according to FIG. 6A, the exact time domain position of the target VSSB within the transmitting time window may be determined, that is, the #1~#12 symbols in a fourth time slot in the VSSB transmission time window, i.e., a slot numbered 3.

In step 24, a time domain synchronization is performed with the vehicle UE according to the time domain position.

For the method embodiments as described above, for concise description, they are all expressed as a series of operation combinations, but it should be noted by one of ordinary skill in the art that the present disclosure is not limited to the described sequence of actions, as some steps can be performed in other order or simultaneously according to the present disclosure.

Secondly, it should be also understood by one of ordinary skill in the art that all the embodiments described in the specification are optional embodiments, and the operations and modules involved are not necessarily required by the present disclosure.

Corresponding to the method embodiments, the present disclosure further provides device embodiments and apparatus embodiments for achieving corresponding application functions.

Figure 12:
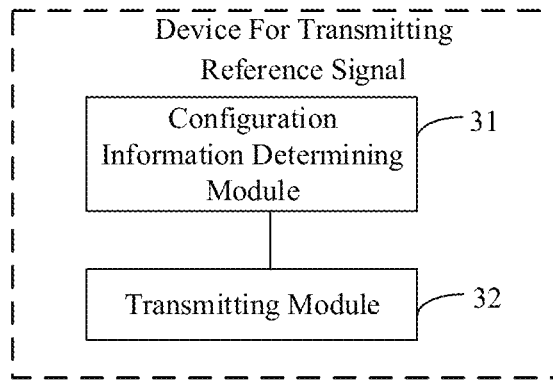
FIG. 12 is a block diagram illustrating a device for transmitting a reference signal according to an exemplary embodiment of the present disclosure.

Correspondingly, the present disclosure provides a device for transmitting a reference signal, which can be provided on vehicle user equipment (UE). Referring to FIG. 12, which is a block diagram illustrating a device for transmitting a reference signal according to an exemplary embodiment, the device may include:
- a configuration information determining module 31, configured to determine transmission configuration information of a synchronization signal block of a new radio-vehicle-to-everything (NR-V2X) system (VSSB), wherein the transmission configuration information includes: a transmission period of the VSSB, and a time domain position of a VSSB transmission time window with the transmission period;
- a transmitting module 32, configured to transmit N VSSBs within the VSSB transmission time window which occurs periodically according to the transmission configuration information, where N is an integer greater than or equal to 1;
- wherein each VSSB includes: a primary sidelink synchronization signal (PSSS), a secondary sidelink synchronization signal (SSSS), a physical sidelink broadcast channel (PSBCH) signal, and a demodulation reference signal (DMRS).

Figure 13:
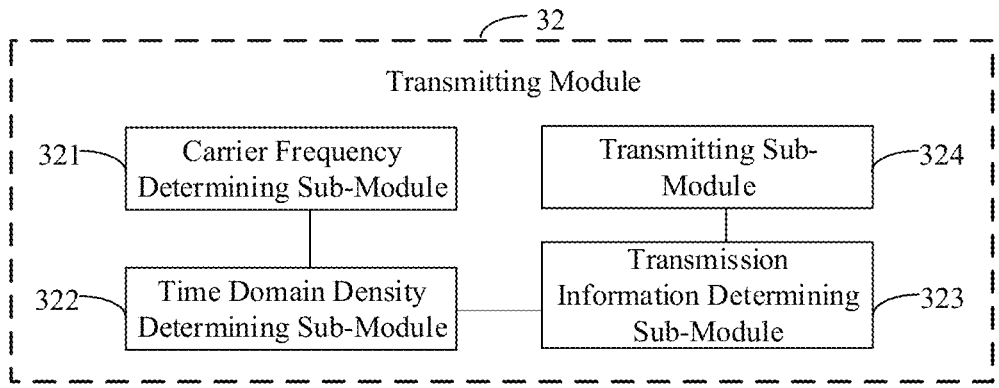
FIG. 13 is a block diagram illustrating a device for transmitting a reference signal according to another exemplary embodiment of the present disclosure.

Referring to FIG. 13 which is a block diagram illustrating another apparatus for transmitting a reference signal according to another exemplary embodiment, based on the apparatus embodiment illustrated in FIG. 12, the transmitting module 32 may include:
- a carrier frequency determining sub-module 321, configured to determine target carrier frequency information for transmitting the VSSB;
- a time domain density determining sub-module 322, configured to determine a target reference signal time domain density for each VSSB to be transmitted according to both the target carrier frequency information and a current speed information of the vehicle UE;
- a transmission information determining sub-module 323, configured to determine transmission information for the VSSB to be transmitted according to the target reference signal time domain density, wherein the transmission information includes: a target subcarrier spacing for transmitting the VSSB and a structure of the VSSB to be transmitted, and the structure of the VSSB to be transmitted involves the number of symbols occupied by each signal and positions of the symbols occupied;
- a transmitting sub-module 324, configured to transmit the VSSB within the VSSB transmission time window according to the transmission information for the VSSB to be transmitted.

Figure 14:
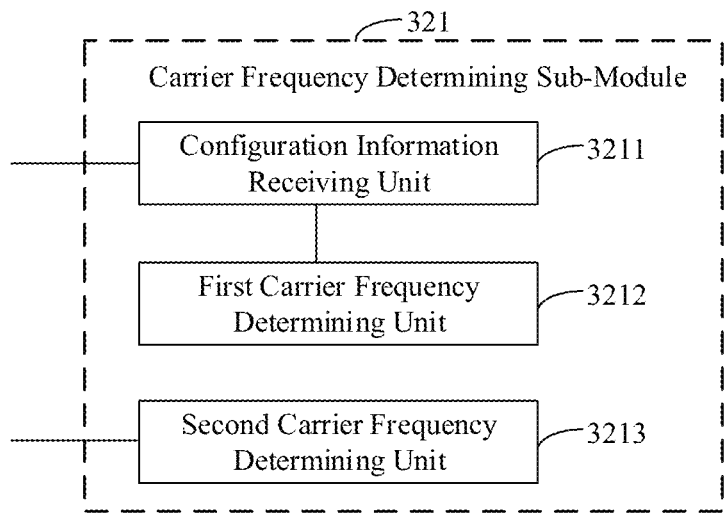
FIG. 14 is a block diagram illustrating a device for transmitting a reference signal according to another exemplary embodiment of the present disclosure.

Referring to FIG. 14, which is a block diagram illustrating an device for transmitting a reference signal according to another exemplary embodiment, on the basis of the apparatus embodiment illustrated in FIG. 13, the carrier frequency determining sub-module 321 may include:
- a configuration information receiving unit 3211, configured to receive resource configuration information from a base station, wherein the resource configuration information is configured to instruct the vehicle UE to transmit the VSSB with the configured resource;
- a first carrier frequency determining unit 3212, configured to determine the target carrier frequency information according to the resource configuration information; or,
- a second carrier frequency determining unit 3213, configured to determine the target carrier frequency information according to preset resource configuration information.

Figure 15:
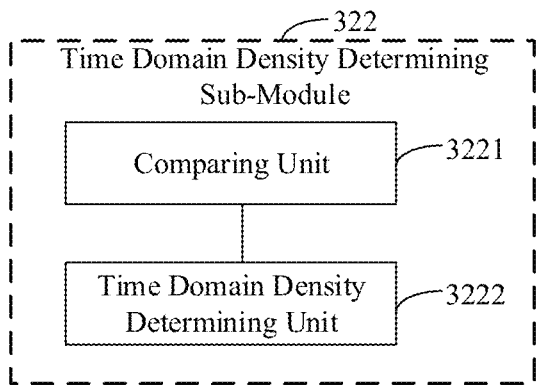
FIG. 15 is a block diagram illustrating a device for transmitting a reference signal according to another exemplary embodiment of the present disclosure.

In a device embodiment of the present disclosure, in a case that the current speed information includes a relative speed between the vehicle UE and the preset receiving terminal;
referring to FIG. 15 which is a block diagram illustrating a device for transmitting a reference signal according to another exemplary embodiment, based on the device embodiment illustrated in FIG. 13, the time domain density determining sub-module 322 may include:
- a comparing unit 3221, configured to obtain a comparison result by comparing the relative speed with a preset speed threshold; and
- a time domain density determining unit 3222, configured to determine the target reference signal time domain density according to both the target carrier frequency information and the comparison result.

In an device embodiment of the present disclosure, the time domain density determining unit 3222 may be configured to increase the reference signal time domain density at the target carrier frequency to a target reference signal time domain density corresponding to the comparison result in response to that the comparison result indicates that the relative speed is greater than or equal to the preset speed threshold.

Correspondingly, the time domain density determining unit 3222 may be configured to increase the reference signal time domain density at the target carrier frequency to the target reference signal time domain density corresponding to the comparison result through at least one of:
- using a structure of the target VSSB, wherein a reference signal proportion of the target VSSB structure is greater than a reference signal proportion of an original VSSB structure, and the reference signal proportion is a ratio of the number of symbols occupied by the reference signal to a duration of the VSSB; and
- increasing the subcarrier spacing for transmitting VSSB at the target carrier frequency.

Figure 16:
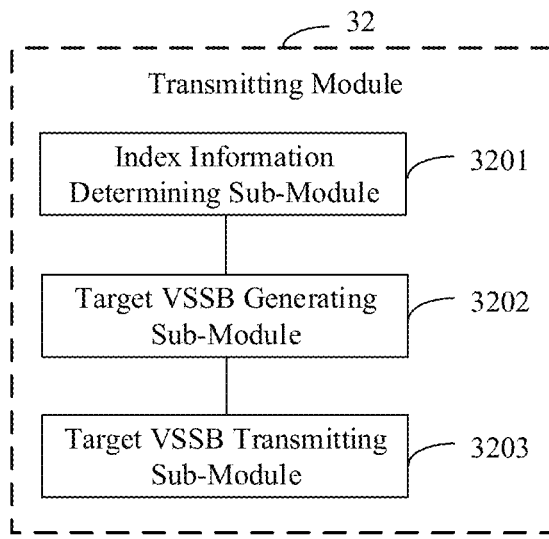
FIG. 16 is a block diagram illustrating a device for transmitting a reference signal according to another exemplary embodiment of the present disclosure.

Referring to FIG. 16 which is a block diagram illustrating a device for transmitting a reference signal according to another exemplary embodiment, on the basis of the device embodiment as illustrated in FIG. 13, the transmitting module 32 may include:
- an index information determining sub-module 3201, configured to determine VSSB index information of each of the VSSBs in response to that N is an integer greater than 1.
- an target VSSB generating sub-module 3202, configured to generate a target VSSB carrying the VSSB index information by loading the VSSB index information into a setting signal of the VSSB to be transmitted;

In a device embodiment of the present disclosure, the target VSSB generating sub-module 3202 may be configured to load the VSSB index information into a preset signal of the VSSB to be transmitted in any one:

indicating the VSSB index information by a corresponding DMRS target sequence;

loading the VSSB index information into a first bit of the preset PSBCH signal; and indicating a part of bit values of the VSSB index information by the corresponding DMRS target sequence, and loading remaining of the bit values into a second bit of the preset PSBCH signal.

A target VSSB transmitting sub-module 3203 is configured to transmit the target VSSB through a plurality of beams within the VSSB transmission time window that occurs periodically.

In a device embodiment of the present disclosure, the transmitting module 32 may be configured to transmit the PSBCH signal and the DMRS signal of each of the VSSBs through at least one of a frequency division multiplexing (FDM) manner and a time division multiplexing (TDM) manner.

Figure 17:
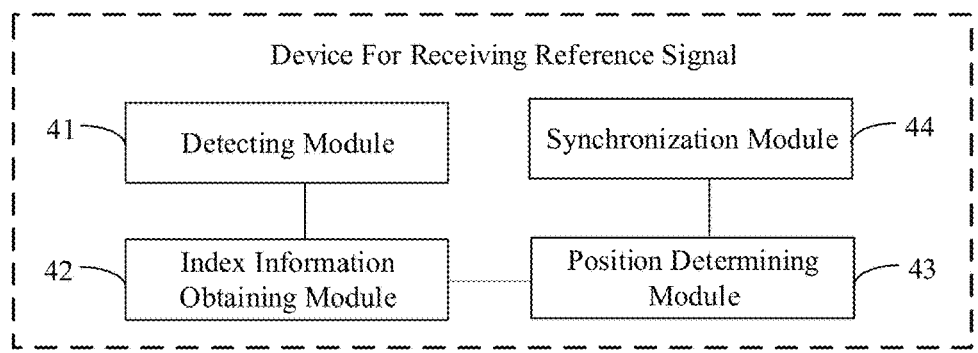
FIG. 17 is a block diagram illustrating a device for receiving a reference signal according to an exemplary embodiment of the present disclosure.

Correspondingly, the present disclosure further provides a device for receiving a reference signal, which is provided in a receiving terminal. Referring to FIG. 17, which is a block diagram illustrating a device for receiving a reference signal according to an exemplary embodiment, the device may include:

a detecting module 41, configured to detect a synchronization signal block of a new radio-vehicle-to-everything (NR-V2X) system (VSSB) transmitted by vehicle user equipment (UE);

an index information obtaining module 42, configured to obtain VSSB index information from a target VSSB that is detected;

a position determining module 43, configured to determine a time domain position of the target VSSB according to the VSSB index information; and a synchronization module 44, configured to perform a time domain synchronization with the vehicle UE according to the time domain position.

Figure 18:
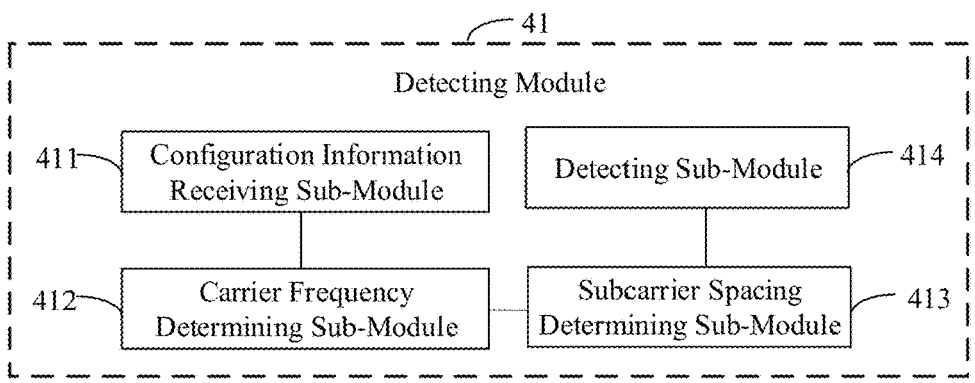
FIG. 18 is a block diagram illustrating a device for receiving a reference signal according to another exemplary embodiment of the present disclosure.

Referring to FIG. 18, which is a block diagram illustrating a device for receiving a reference signal according to another exemplary embodiment, based on the apparatus embodiment illustrated in FIG. 17, the detecting module 41 may include:

a configuration information receiving sub-module 411, configured to receive resource configuration information from a base station, where the resource configuration information is configured to instruct the receiving terminal to receive the VSSB with the configured resource;

a carrier frequency determining sub-module 412, configured to determine target carrier frequency information for receiving the VSSB according to the resource configuration information;

a subcarrier spacing determining sub-module 413, configured to determine a detecting subcarrier spacing according to the target carrier frequency information; and a detecting sub-module 414, configured to detect the VSSB on a target resource with each detecting subcarrier spacing.

Figure 19:
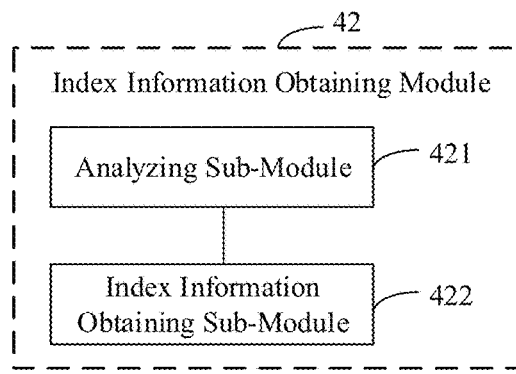
FIG. 19 is a block diagram illustrating a device for receiving a reference signal according to another exemplary embodiment of the present disclosure.

Referring to FIG. 19, which is a block diagram illustrating a device for receiving a reference signal according to an exemplary embodiment, based on the apparatus embodiment as illustrated in FIG. 17, the index information obtaining module 42 may include:

an analyzing sub-module 421, configured to obtain respective signals by analyzing the target VSSB, wherein the respective signals includes a primary sidelink synchronization signal (PSSS), a secondary sidelink synchronization signal (SSSS), a physical sidelink broadcast channel (PSBCH) signal and a demodulation reference signal (DMRS); and an index information obtaining sub-module 422, configured to obtain the VSSB index information from a setting signal which includes at least one of the PSBCH signal and the DMRS signal.

Figure 20:
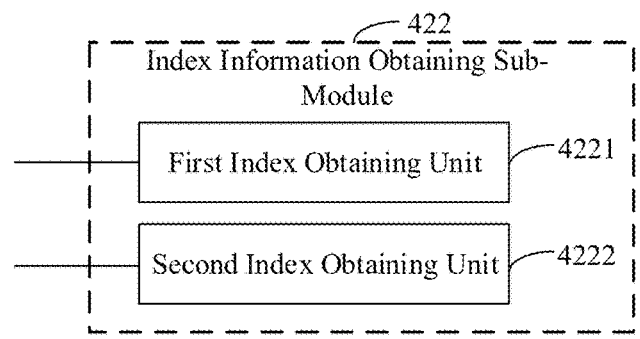
FIG. 20 is a block diagram illustrating a device for receiving a reference signal according to another exemplary embodiment of the present disclosure.

Referring to FIG. 20, which is a block diagram illustrating a device for receiving a reference signal according to another exemplary embodiment, based on the apparatus embodiment illustrated in FIG. 19, the index information obtaining sub-module 422 may include:

a first index obtaining unit 4221, configured to obtain the VSSB index information from information carried in the preset DMRS sequence; and a second index obtaining unit 4222, configured to obtain the VSSB index information by analyzing a first bit of the preset PSBCH signal.

Figure 21:
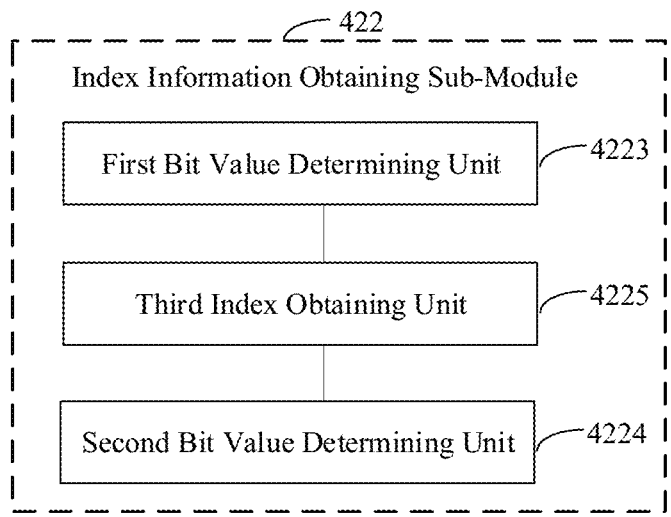
FIG. 21 is a block diagram illustrating a device for receiving a reference signal according to another exemplary embodiment of the present disclosure.

Referring to FIG. 21, which is a block diagram illustrating a device for receiving a reference signal according to an exemplary embodiment, based on the device embodiment illustrated in FIG. 19, the index information acquiring sub-module includes:

a first bit value determining unit 4223, configured to obtain a part of bit values of the VSSB index information according to the information carried by the preset DMRS sequence;

a second bit value determining unit 4224, configured to obtain remaining of the bit values of the VSSB index information from a second bit of the preset PSBCH signal; and a third index obtaining unit 4225, configured to determine the VSSB index information according to complete bit values composed of the part of bit values and the remaining of the bit values.

In another device embodiment of the present disclosure, the position determining module may be configured to determine a time domain position of the target VSSB according to the VSSB index information, the target carrier frequency information, and the target subcarrier spacing; wherein the target subcarrier spacing indicates a detecting subcarrier spacing used to detect the target VSSB.

As for the device embodiment, since it substantially corresponds to the method embodiment, relevant parts may be referred to the part of the description of the method embodiment. The device embodiments described above are merely illustrative. The units described above as separate components may or may not be physically separated, and the components displayed as units may or may not be physical units, that is, they may be located at a position, or they may be distributed over multiple network units. Some or all of the modules may be selected according to actual requirement to achieve the objectives of the solutions of the present disclosure. One of ordinary skill in the art can understand and implement it without any creative works.

Correspondingly, on the one hand, vehicle user equipment (UE) is provided, including:

a processor;

memory, configured to store instructions executable by the processor;

wherein, the processor is configured to:
determine transmission configuration information of a synchronization signal block of a new radio-vehicle-to-everything (NR-V2X) system (VSSB), the transmission configuration information including: a transmission period of the VSSB, and a time domain position of a VSSB transmission time window within the transmission period; and
according to the transmission configuration information, transmit N VSSBs within the VSSB transmission time window that occurs periodically, where N is an integer greater than or equal to 1;
wherein each VSSB includes: a primary sidelink synchronization signal (PSSS), a secondary sidelink synchronization signal (SSSS), a physical sidelink broadcast channel (PSBCH) signal, and a demodulation reference signal (DMRS).

On the other hand, a terminal is provided, including:
a processor;
memory, configured to store instructions executable by the processor;
wherein, the processor is configured to:
detect, a synchronization signal block of a new radio-vehicle-to-everything (NR-V2X) system (VSSB) transmitted by vehicle user equipment (UE);
obtain VSSB index information from a target VSSB that is detected;
determine a time domain position of the target VSSB according to the VSSB index information; and
perform a time domain synchronization with the vehicle UE according to the time domain position.

Figure 22:
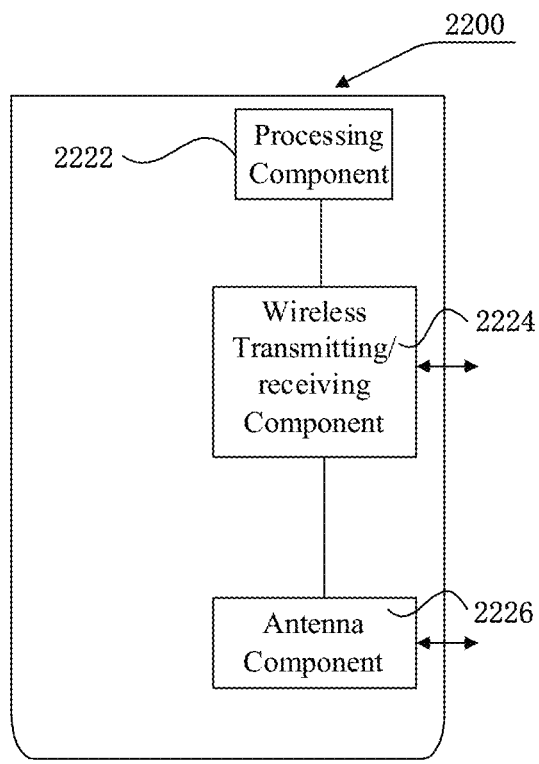
FIG. 22 is a schematic structural diagram illustrating a vehicle-borne device according to an exemplary embodiment of the present disclosure.

Referring to FIG. 22, which is a schematic structural diagram illustrating vehicle user equipment (UE) 2200 according to an exemplary embodiment. As illustrated in FIG. 22, a base station 2200 includes a processing component 2222, a wireless transmitting/receiving component 2224, an antenna component 2226, and a signal processing part specific to a wireless interface. The processing component 2222 may further include one or more processors.

One processor of the processing component 2222 may be configured to:
determine transmission configuration information of a synchronization signal block of a new radio-vehicle-to-everything (NR-V2X) system (VSSB), the transmission configuration information includes: a transmission period of the VSSB, and a time domain position of a VSSB transmission time window within the transmission period;
transmit N VSSBs within a VSSB transmission time window that occurs periodically according to the transmission configuration information, where N is an integer greater than or equal to 1;
wherein each of the VSSBs includes: a primary sidelink synchronization signal (PSSS), a secondary sidelink synchronization signal (SSSS), a physical sidelink broadcast channel (PSBCH) signal, and a demodulation reference signal (DMRS).

In an exemplary embodiment, there is further provided a non-transitory computer-readable storage medium on which computer instructions are stored. The computer instructions can be executed by a processing component 2222 of vehicle user equipment (UE) 2200 to implement operations of any method of transmitting a reference signal as illustrated in FIGS. 2-7. For example, the non-transitory computer-readable storage medium may be ROM, random access memory (RAM), CD-ROM, magnetic tape, floppy disk, optical data storage device, etc.

Figure 23:
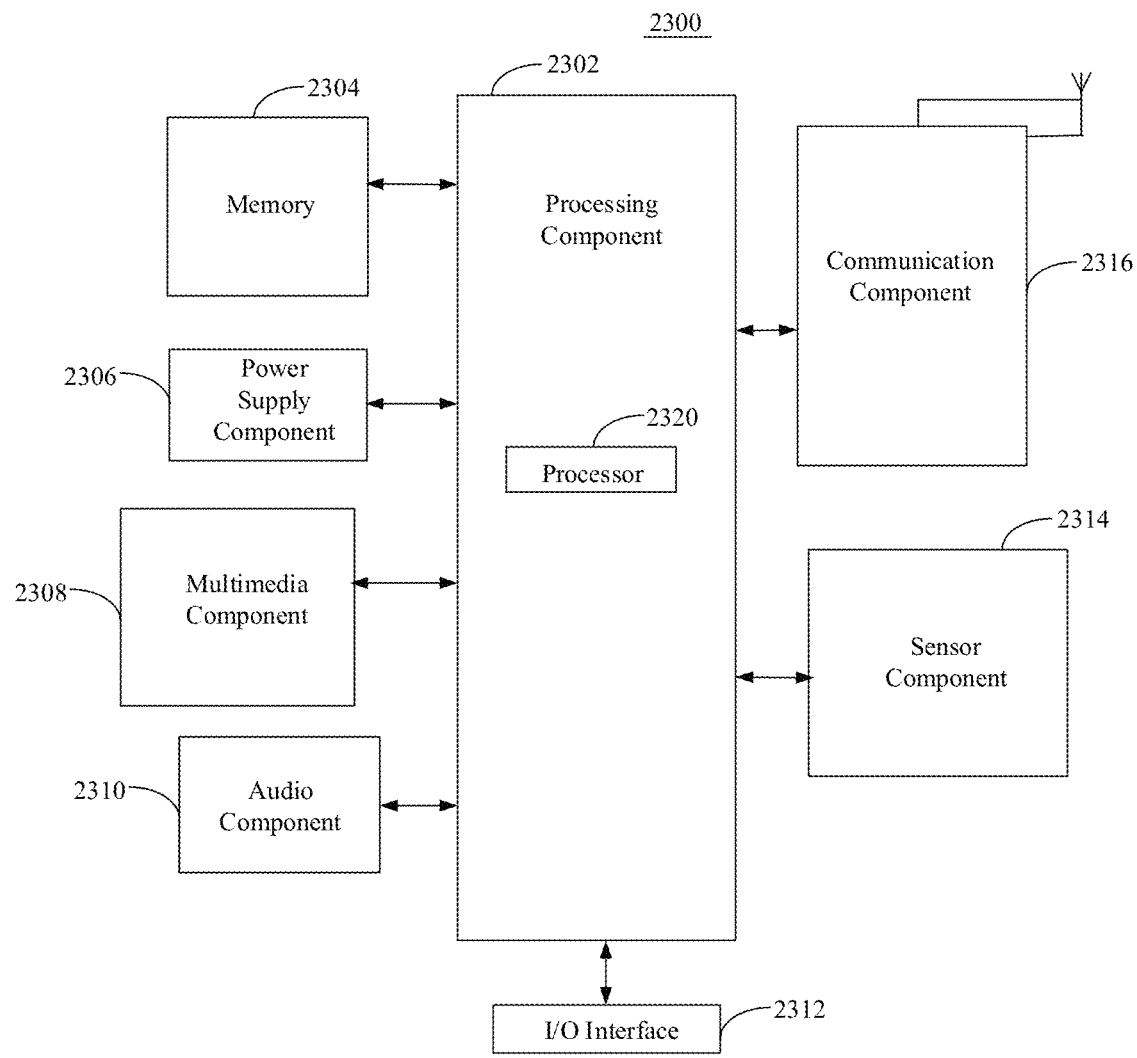
FIG. 23 is a schematic structural diagram illustrating a terminal according to an exemplary embodiment of the present disclosure.

FIG. 23 is a schematic structural diagram illustrating a terminal 2300 according to an exemplary embodiment. For example, the terminal 2300 may be user equipment, which may specifically be a mobile phone, a computer, a digital broadcasting terminal, a messaging device, a game console, a tablet device, a medical device, a fitness device, a personal digital assistant, and wearable devices such as smart watches and smart glasses, smart bracelets, smart running shoes, etc.

Referring to FIG. 23, the terminal 2300 may include one or more of the following components: a processing component 2302, a memory 2304, a power supply component 2306, a multimedia component 2308, an audio component 2310, an input/output (I/O) interface 2312, a sensor component 2314, and a communication component 2316.

The processing component 2302 generally controls overall operations of the terminal 2300, such as operations associated with display, telephone calls, data communication, camera operations, and recording operations. The processing component 2302 may include one or more processors 2320 to execute instructions to perform all or part of the steps of any one of the methods as described above. In addition, the processing component 2302 may include one or more modules to facilitate interaction between the processing component 2302 and other components. For example, the processing component 2302 may include a multimedia module to facilitate interaction between the multimedia component 2308 and the processing component 2302.

The memory 230 is configured to store various types of data to support operations on the terminal 2300. Examples of these data include instructions for any application or method operated on the terminal 2300, contact data, phone book data, messages, pictures, videos, etc. The memory 2304 can be implemented by any type of volatile or non-volatile storage device or their combination, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk or optical disk.

The power supply component 2306 provides power for respective components of the terminal 2300. The power supply component 2306 may include a power management system, one or more power supplies, and other components associated with the generation, management, and distribution of power for the terminal 2300.

The multimedia component 2308 includes a screen providing an output interface between the terminal 2300 and a user. In some embodiments of the present disclosure, the screen may include a liquid crystal display (LCD) and a touch panel (TP). In a case that the screen includes a touch panel, the screen may be implemented as a touch screen to receive input signals from the user. The touch panel includes one or more touch sensors to sense touch, sliding, and gestures on the touch panel. The touch sensor can not only sense the boundary of the touch or sliding operation, but also detect a duration and a pressure related to the touch or sliding operation. In some embodiments of the present disclosure, the multimedia component 2308 includes a front camera and/or a rear camera. In a case that the device 2300 is in an operation mode, such as a shooting mode or a video recording mode, the front camera and/or the rear camera can receive external multimedia data. Each of the front camera and the rear camera may be a fixed optical lens system or have a focal length with optical zooming capabilities.

The audio component 2310 is configured to output and/or input audio signals. For example, the audio component 2310 includes a microphone (MIC). In a case that the terminal 2300 is in an operation mode, such as a call mode, a recording mode, and a voice recognition mode, the microphone is configured to receive external audio signals. The received audio signal may be further stored in the memory 2304 or transmitted via the communication component 2316. In some embodiments of the present disclosure, the audio component 2310 further includes a speaker for outputting audio signals.

The I/O interface 2312 provides an interface between the processing component 2302 and the peripheral interface module. The peripheral interface module may be a keyboard, a click wheel, buttons, and the like. The buttons may include but are not limited to: a home button, a volume button, a start button, and a locking button.

The sensor component 2314 includes one or more sensors for providing the terminal 2300 with status evaluation of various aspects. For example, the sensor component 2314 can detect the ON/OFF status of the device 2300 and relative positioning of the components. For example, the components are a display and a keypad of the terminal 2300. The sensor component 2314 can also detect the position change of the terminal 2300 or a component of the terminal 2300. The presence or absence of contact between the user and the terminal 2300, the orientation or acceleration/deceleration of the terminal 2300, and the temperature change of the terminal 2300. The sensor assembly 2314 may include a proximity sensor configured to detect presence of nearby objects in a case that there is no physical contact. The sensor component 2314 may further include a light sensor, such as a CMOS or CCD image sensor, for imaging applications. In some embodiments of the present disclosure, the sensor component 2314 may further include an acceleration sensor, a gyroscope sensor, a magnetic sensor, a pressure sensor or a temperature sensor.

The communication component 2316 is configured to facilitate wired or wireless communication between the terminal 2300 and other devices. The terminal 2300 may access a wireless network based on a communication standard, such as WiFi, 2G, 3G, 4G LTE, 5G NR, or a combination thereof. In an exemplary embodiment of the present disclosure, the communication component 2316 receives a broadcast signal or broadcast related information from an external broadcast management system via a broadcast channel. In an exemplary embodiment of the present disclosure, the communication component 2316 further includes a near field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology and other technologies.

In an exemplary embodiment of the present disclosure, the terminal 2300 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors, or other electronic components, and is configured to perform any one of the methods as described above.

In an exemplary embodiment of the present disclosure, there is further provided a non-transitory computer-readable storage medium including instructions, such as a memory 2304 including instructions, which may be executed by the processor 2320 of the terminal 2300 to implement operations of any of the methods of receiving a reference signal as illustrated in FIGS. 8-11. For example, the non-transitory computer-readable storage medium may be ROM, random access memory (RAM), CD-ROM, magnetic tape, floppy disk, optical data storage device, etc.

After considering the specification and practicing the disclosure disclosed herein, one of ordinary skill in the art will easily conceive of other embodiments of the present disclosure. This application is intended to cover any variations, applications, or adaptive changes of the present disclosure. These variations, applications, or adaptive changes follow the general principles of the present disclosure and include common knowledge or conventional technical means in the technical field not disclosed in the present disclosure. The description and the embodiments are only regarded as exemplary, and the true scope and spirit of the present disclosure are pointed out by the following claims.

It should be understood that the present disclosure is not limited to the exact structure that has been described above and illustrated in the drawings, and various modifications and changes may be made without departing from its scope. The scope of the present disclosure is only defined by the appended claims.

The invention claimed is:

1. A method of transmitting a reference signal, comprising:
   determining, by a vehicle user equipment (UE), transmission configuration information of a synchronization signal block in a new radio-vehicle-to-everything (NR-V2X) system (VSSB), wherein the transmission configuration information comprises a transmission period of the VSSB, and a time domain position of a VSSB transmission time window within the transmission period;
   transmitting, by the vehicle UE and according to the transmission configuration information, one or more VSSBs within the VSSB transmission time window that occurs periodically, and the one or more VSSBs comprises the VSSB;
   wherein each of the one or more VSSBs comprises a primary sidelink synchronization signal (PSSS), a secondary sidelink synchronization signal (SSSS), a physical sidelink broadcast channel (PSBCH) signal, and a demodulation reference signal (DMRS);
   wherein transmitting the one or more VSSBs within the VSSB transmission time window that occurs periodically comprises:
   transmitting the PSBCH signal and the DMRS of each of the one or more VSSBs in a frequency division multiplexing (FDM) manner;
   in response to N greater than 1, determining VSSB index information for each of the one or more VSSBs, wherein N is a number of the one or more VSSBs and N is a positive integer; and
   generating a target VSSB carrying the VSSB index information by loading the VSSB index information into a setting signal of a VSSB to be transmitted, wherein the setting signal comprises the PSBCH signal, the DMRS, or the PSBCH signal and the DMRS.

2. The method according to claim 1, wherein transmitting the one or more VSSBs within the VSSB transmission time window that occurs periodically comprises:
   determining target carrier frequency information for transmitting the one or more VSSBs;
   for each VSSB to be transmitted, determining, according to the target carrier frequency information and current speed information of the vehicle UE, a target reference signal time domain density for the VSSB to be transmitted;

determining transmission information for the VSSB to be transmitted according to the target reference signal time domain density, wherein the transmission information comprises a target subcarrier spacing for transmitting the VSSB and a structure of the VSSB to be transmitted, and the structure of the VSSB to be transmitted comprises a number of symbols occupied by each signal and a position of the occupied symbols; and transmitting, according to the transmission information for the VSSB to be transmitted, the VSSB within the VSSB transmission time window.

3. The method according to claim 2, wherein determining the target carrier frequency information for transmitting the one or more VSSBs comprises:

receiving resource configuration information from a base station, wherein the resource configuration information is configured to instruct the vehicle UE to transmit the one or more VSSBs with configured resource; and determining the target carrier frequency information according to the resource configuration information; or determining the target carrier frequency information according to preset resource configuration information.

4. The method according to claim 2, wherein the current speed information comprises a relative speed between the vehicle UE and a preset receiving terminal;

determining, according to the target carrier frequency information and the current speed information of the vehicle UE, the target reference signal time domain density for each VSSB to be transmitted, comprises:

obtaining a comparison result by comparing the relative speed with a preset speed threshold; and determining the target reference signal time domain density according to the target carrier frequency information and the comparison result.

5. The method according to claim 4, wherein determining the target reference signal time domain density according to the target carrier frequency information and the comparison result comprises:

in response to the comparison result indicating that the relative speed is greater than or equal to the preset speed threshold, increasing a reference signal time domain density at the target carrier frequency to a target reference signal time domain density corresponding to the comparison result.

6. The method according to claim 5, wherein increasing the reference signal time domain density at the target carrier frequency to the target reference signal time domain density corresponding to the comparison result is implemented through at least one of followings:

using a target VSSB structure, wherein a reference signal proportion in the target VSSB structure is greater than a reference signal proportion in an original VSSB structure, and the reference signal proportion is a ratio of a number of symbols occupied by the reference signal to a duration occupied by the VSSB; and increasing a subcarrier spacing for transmitting the one or more VSSBs at the target carrier frequency.

7. The method according to claim 1, wherein transmitting the one or more VSSBs within the VSSB transmission time window that occurs periodically further comprises:

transmitting one or more target VSSBs through a plurality of beams within the VSSB transmission time window that occurs periodically, wherein the one or more target VSSBs comprise the target VSSB.

8. The method according to claim 1, wherein loading the VSSB index information into the setting signal of the VSSB to be transmitted is implemented through one of following acts:

indicating the VSSB index information by a corresponding DMRS target sequence;

loading the VSSB index information into a first bit of the PSBCH signal; and indicating a part of bit values of the VSSB index information by the corresponding DMRS target sequence, and loading remaining of the bit values into a second bit of the preset PSBCH signal.

9. The method according to claim 1, wherein transmitting the one or more VSSBs within the VSSB transmission time window that occurs periodically further comprises:

transmitting the PSBCH signal and the DMRS of each of the one or more VSSBs in a time division multiplexing (TDM) manner.

10. A method of receiving a reference signal, comprising:

detecting, by a receiving terminal, a synchronization signal block in a new radio-vehicle-to-everything (NR-V2X) system (VSSB) transmitted from a vehicle user equipment (UE), wherein the VSSB comprises a primary sidelink synchronization signal (PSSS), a secondary sidelink synchronization signal (SSSS), a physical sidelink broadcast channel (PSBCH) signal, and a demodulation reference signal (DMRS), and the PSBCH signal and the DMRS of the VSSB are transmitted in a frequency division multiplexing (FDM) manner;

obtaining, by the receiving terminal, VSSB index information from a target VSSB detected;

determining, by the receiving terminal, a time domain position of the target VSSB according to the VSSB index information; and performing, by the receiving terminal, a time domain synchronization with the vehicle UE according to the time domain position;

wherein obtaining the VSSB index information from the target VSSB detected comprises:

obtaining the PSSS, the SSSS, the PSBCH signal and the DMRS by analyzing the target VSSB; and obtaining the VSSB index information from a setting signal, wherein the setting signal comprises at least one of the PSBCH signal and the DMRS.

11. The method according to claim 10, wherein detecting the VSSB transmitted from the vehicle UE comprises:

receiving resource configuration information from a base station, wherein the resource configuration information is configured to instruct the receiving terminal to receive the VSSB through configured resource;

determining, according to the resource configuration information, target carrier frequency information for receiving the VSSB;

determining a detecting subcarrier spacing according to the target carrier frequency information; and detecting the VSSB at a target frequency band with each detecting subcarrier spacing.

12. The method according to claim 10, wherein obtaining the VSSB index information from the setting signal comprises one of following acts:

obtaining the VSSB index information from information carried by a setting DMRS sequence; and obtaining the VSSB index information by analyzing bits of a setting PSBCH signal.

13. The method according to claim 10, wherein obtaining the VSSB index information from the setting signal comprises:
obtaining a part of bit values of the VSSB index information from information carried by a setting DMRS sequence,
obtaining remaining of the bit values of the VSSB index information from bits of a setting PSBCH signal; and
determining the VSSB index information according to complete bit values composed of the part of the bit values and the remaining of the bit values.

14. The method according to claim 11, wherein determining the time domain position of the VSSB according to the VSSB index information comprises:
determining the time domain position of the target VSSB according to the VSSB index information, the target carrier frequency information, and a target subcarrier spacing; wherein the target subcarrier spacing indicates a detecting subcarrier spacing used to detect the target VSSB.

15. A vehicle user equipment (UE), comprising:
a processor;
a memory, configured to store instructions executable by the processor;
wherein the processor is configured to:
determine transmission configuration information of a synchronization signal block in a new radio-vehicle-to-everything (NR-V2X) system (VSSB), wherein the transmission configuration information comprises a transmission period of the VSSB, and a time domain position of a VSSB transmission time window within the transmission period;
transmit one or more VSSBs within the VSSB transmission time window that occurs periodically according to the transmission configuration information, where the one or more VSSBs comprise the VSSB;
wherein each VSSB comprises: a primary sidelink synchronization signal (PSSS), a secondary sidelink synchronization signal (SSSS), a physical sidelink broadcast channel (PSBCH) signal, and a demodulation reference signal (DMRS);
wherein transmitting the one or more VSSBs within the VSSB transmission time window that occurs periodically comprises:
transmitting the PSBCH signal and the DMRS of each of the one or more VSSBs in a frequency division multiplexing (FDM) manner;
in response to N greater than 1, determining VSSB index information for each of the one or more VSSBs, wherein N is a number of the one or more VSSBs and N is a positive integer; and
generating a target VSSB carrying the VSSB index information by loading the VSSB index information into a setting signal of a VSSB to be transmitted, wherein the setting signal comprises the PSBCH signal, the DMRS, or the PSBCH signal and the DMRS.

16. The vehicle UE according to claim 15, wherein the processor is configured to transmit the one or more VSSBs within the VSSB transmission time window that occurs periodically comprises:
the processor is configured to:
determine target carrier frequency information for transmitting the one or more VSSBs;
for each VSSB to be transmitted,
determine, according to the target carrier frequency information and current speed information of the vehicle UE, a target reference signal time domain density for the VSSB to be transmitted;
determine transmission information for the VSSB to be transmitted according to the target reference signal time domain density, wherein the transmission information comprises a target subcarrier spacing for transmitting the VSSB and a structure of the VSSB to be transmitted, and the structure of the VSSB to be transmitted comprises the number of symbols occupied by each signal and a position of the occupied symbols; and
transmit, according to the transmission information for the VSSB to be transmitted, the VSSB within the VSSB transmission time window.

17. The vehicle UE according to claim 16, wherein the processor is configured to determine the target carrier frequency information for transmitting the one or more VSSBs comprises:
the processor is configured to:
receive resource configuration information from a base station, wherein the resource configuration information is configured to instruct the vehicle UE to transmit the one or more VSSBs with configured resource; and
determine the target carrier frequency information according to the resource configuration information; or
determine the target carrier frequency information according to preset resource configuration information.

18. The vehicle UE according to claim 16, wherein the current speed information comprises a relative speed between the vehicle UE and a preset receiving terminal;
wherein the processor is configured to determine, according to the target carrier frequency information and the current speed information of the vehicle UE, the target reference signal time domain density for each VSSB to be transmitted comprises:
the processor is configured to:
obtain a comparison result by comparing the relative speed with a preset speed threshold; and
determine the target reference signal time domain density according to the target carrier frequency information and the comparison result.

19. A terminal, comprising:
a processor;
a memory, configured to store instructions executable by the processor;
wherein when the instructions are executed, the processor is configured to:
detect a synchronization signal block of a new radio-vehicle-to-everything (NR-V2X) system (VSSB) transmitted from a vehicle user equipment (UE), wherein the VSSB comprises a primary sidelink synchronization signal (PSSS), a secondary sidelink synchronization signal (SSSS), a physical sidelink broadcast channel (PSBCH) signal, and a demodulation reference signal (DMRS), and the PSBCH signal and the DMRS of the VSSB are transmitted in a frequency division multiplexing (FDM) manner;
obtain VSSB index information from a target VSSB detected;
determine a time domain position of the target VSSB according to the VSSB index information; and
perform a time domain synchronization with the vehicle UE according to the time domain position;
wherein obtaining the VSSB index information from the target VSSB detected comprises:
obtaining the PSSS, the SSSS, the PSBCH signal and the DMRS by analyzing the target VSSB; and obtaining the VSSB index information from a setting signal, wherein the setting signal comprises at least one of the PSBCH signal and the DMRS.

\* \* \* \* \*